(12) United States Patent
Sample

(10) Patent No.: US 6,473,675 B2
(45) Date of Patent: *Oct. 29, 2002

(54) AIRCRAFT COMMUNICATION FREQUENCY NOMINATION

(75) Inventor: William G. Sample, Paola, KS (US)

(73) Assignee: Honeywell International, Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/638,086

(22) Filed: Aug. 11, 2000

(65) Prior Publication Data
US 2002/0065586 A1 May 30, 2002

Related U.S. Application Data
(60) Provisional application No. 60/199,578, filed on Apr. 25, 2000.

(51) Int. Cl.⁷ .................................................. G06F 17/00
(52) U.S. Cl. ........................ 701/3; 701/14; 701/206; 701/201
(58) Field of Search ................................ 701/3, 14, 200, 701/201, 213, 206

(56) References Cited

U.S. PATENT DOCUMENTS

| | | | | |
|---|---|---|---|---|
| 4,672,383 A | * | 6/1987 | Edwards et al. | 342/394 |
| 4,692,869 A | * | 9/1987 | King et al. | 701/206 |
| 5,398,186 A | | 3/1995 | Nakhla | 364/428 |
| 5,475,594 A | * | 12/1995 | Oder et al. | 701/14 |
| 5,519,392 A | | 5/1996 | Oder et al. | 340/995 |
| 5,526,265 A | * | 6/1996 | Nakhla | 701/16 |
| 5,842,142 A | * | 11/1998 | Murray et al. | 701/16 |
| 5,978,715 A | * | 11/1999 | Briffe et al. | 701/11 |
| 6,038,498 A | | 3/2000 | Briffe et al. | 701/3 |

FOREIGN PATENT DOCUMENTS

| | | | | |
|---|---|---|---|---|
| EP | 0826946 A | | 3/1998 | G01C/23/00 |
| JP | 04098175 | * | 3/1992 | |
| WO | WO 98 15912 A | | 4/1998 | G06F/165/00 |

* cited by examiner

Primary Examiner—Michael J. Zanelli
Assistant Examiner—Eric M Gibson

(57) ABSTRACT

An aviation facility nominating device for an aircraft includes a position receiving component that receives position data indicating a position of the aircraft, an aviation data receiving component that receives aviation data associated with a plurality of aviation facilities, a facility selecting component for selecting aviation data for a selected plurality of the aviation facilities based on a position of the aircraft and a nominating component that nominates at least one but not all of the selected plurality of aviation facilities as a nominated aviation facility likely to be of interest to a pilot based on the position of the aircraft. In another embodiment, an aviation signal nominating device includes a position receiving component that receives position data indicating a position of the aircraft, an aviation signal receiving component that receives a plurality of aviation signals associated with an aviation facility, each aviation signal having a prescribed frequency, and a nominating component that nominates at least one but not all of the plurality of aviation signals as a nominated aviation signal likely to be of interest to a pilot based on the position of the aircraft.

69 Claims, 16 Drawing Sheets

AIRCRAFT COMMUNICATION FREQUENCY NOMINATION

This application claims the benefit of U.S. Provisional Application No. 60/199,578 filed on Apr. 25, 2000.

BACKGROUND OF THE INVENTION

The present invention is directed to communication devices for aircraft and, more particularly, to an aircraft communication device that displays desired communication frequencies in a desired order and which suggests a frequency most likely to be needed by the pilot at a particular time.

Modem aircraft pilots must send and receive information to and from a large number of facilities. For example, a pilot beginning a flight ordinarily will set the communication equipment to the frequency for the originating airport's Automatic Terminal Information Service (ATIS) to learn the local weather conditions, winds, and runways(s) and instrument approach(es) currently in use. Then, the pilot may contact a Clearance Delivery (CLR) facility on another frequency to obtain permission to depart the airport. Thereafter, the pilot may contact a Ground Control (GRND) facility on another frequency for permission to use the taxiways. After that, the pilot may contact the Control Tower (TWR) and requests permission to take off. Once airborne, the pilot may contact a Flight Service Station (FSS) on another frequency to open a previously-filed flight plan.

Once airborne, the pilot may contact a Departure Control (DEP) facility on another frequency for instructions until the aircraft leaves the controlled airspace. Thereafter, the pilot may contact the appropriate sector of an Air Route Traffic Control Center (Center or CTR) having responsibility for the airspace through which the aircraft is passing on another frequency for advisories and/or instructions en-route to the destination airport. Since the aircraft may pass through multiple sectors for a Center before reaching the destination airport, the pilot may have to change frequencies whenever passing from one sector to another. Should the aircraft intend to enter or pass through Class B, C or D controlled airspaces during the flight, then the pilot must contact the Approach Control (APP) facility or TWR of the controlled airspace to inform them of a desire to enter or pass through the controlled airspace. The APP or TWR for each such controlled airspace typically will have its own communication frequency.

If the pilot desires to learn of any important weather information during the flight, he or she may tune to a Hazardous In-flight Weather Advisory Service (HIWAS) on another frequency. The pilot also may contact an Enroute Flight Advisory Service (EFAS or Flight Watch) of the FSS that services the area that the aircraft is passing through on another frequency for additional weather information. An FSS frequency other than a Flight Watch frequency may be contacted to determine the status of Special Use Areas (SUA's) such as restricted areas and Military Operations Areas (MOA's), and other information.

If the destination airport is a non-tower-controlled airport, the pilot may obtain weather information as he or she nears the airport by tuning to an Automated Surface Observation System (ASOS) or Automated Weather Observing System (AWOS) at their designated frequencies. The pilot may obtain other information and services at such airports by contacting the airport on a separate unicom frequency. As the aircraft approaches the airport, the pilot usually broadcasts his or her intentions over the unicom frequency as well. If the airport does not have unicom capability, then the pilot will broadcast on a multicom frequency that typically is monitored by air traffic in the vicinity of the airport.

If a destination airport is within a terminal radar area, then the pilot may need to contact an Approach Control facility for the destination airport on the appropriate frequency for permission to enter the controlled airspace. Thereafter, the pilot will contact the Control Tower at the destination airport on the appropriate frequency for landing instructions. Once the aircraft is on the ground, the pilot may contact Ground Control at another frequency for taxiing instructions. Thereafter, the pilot may contact the FSS on another frequency to close the flight plan. The pilot may also choose to use the Unicom frequency to communicate with non-control facilities at the airport.

In addition to the voice communication frequencies noted above, the aircraft equipment uses additional frequencies for navigation. For example, different VOR frequencies associated with different VOR ground transmitters along the flight path may be used by a VOR receiver in the aircraft to guide the aircraft along a designated flight route. Frequencies associated with Tactical Air Navigation (TACAN) equipment associated with a VOR (the combination being referred to as a VORTAC), for example, may be used by Distance Measuring Equipment (DME) in the aircraft to indicate the distance between the aircraft and the VORTAC. Signals transmitted on other frequencies by nondirectional radio beacons (NDB's) may be used by Automatic Direction Finder (ADF) equipment in the aircraft to indicate the bearing of the aircraft relative to the NDB. During instrument-guided landings a localizer transmitter at an airport runway transmits signals at another frequency for horizontal guidance of the aircraft to the longitudinal center of the runway, and a glide slope transmitter transmits signals at another frequency for vertical guidance of the aircraft to the desired glide slope for the runway. While newer aircraft equipment automatically selects the appropriate glide slope frequency from a selected localizer frequency, older aircraft equipment require the pilot to select each frequency independently.

Clearly, the pilot must have knowledge of a large number of communication and navigation frequencies for a successful flight. Keeping track of all the required and desired frequencies can be very difficult, and failure to use the proper frequency at the proper time can have serious consequences. Indeed, fatal crashes have resulted from a pilot being tuned to the wrong frequency for a particular airspace.

The assignee of the present invention has built navigation/communication (navcomm) equipment which attempts to alleviate some of the difficulty in accessing the correct frequency for a particular situation. For example, the model KLN 89B and KLN 900 Global Positioning System (GPS) Navigation Systems have a "nearest" function which displays a menu of airports (APT's), VOR's, NDB's, intersections (INT), SUA's, FSS's, CTR's and user defined waypoints (USR) that are closest to the aircraft. A cursor is used to select the desired entry (APT, VOR, etc.) for a listing of the information, including navcomm frequencies, associated with the entry. However, the menu itself merely lists the acronyms, and the screen displaying the information associated with the selected acronym merely lists the information in no particular order that helps the pilot determine which frequency may be needed. Furthermore, if the pilot is viewing a page of airport information and wants to view information for a flight service station, the pilot must return to the menu of acronyms and select the FSS acronym. The page of data for the nearest FSS's is displayed, but then the pilot no longer has the previous airport information readily available.

SUMMARY OF THE INVENTION

The present invention is directed to an aircraft navigation system wherein facility information and communication and/or navigation frequencies are displayed by the equipment in a manner which allows the pilot to select the facility and/or frequency most likely needed for a particular situation. In one embodiment of the present invention, an aviation facility nominating device for aircraft includes a position receiving component that receives position data indicating a position of the aircraft, an aviation data receiving component that receives aviation data associated with a plurality of aviation facilities, a facility selecting component for selecting aviation data for a selected plurality of the aviation facilities based on a position of the aircraft and a nominating component that nominates at least one but not all of the selected plurality of aviation facilities as a nominated aviation facility likely to be of interest to a pilot based on the position of the aircraft. In another embodiment of the present invention, an aviation signal nominating device includes a position receiving component that receives position data indicating a position of the aircraft, an aviation signal receiving component that receives a plurality of aviation signals associated with an aviation facility, each aviation signal having a prescribed frequency, and a nominating component that nominates at least one but not all of the plurality of aviation signals as a nominated aviation signal likely to be of interest to a pilot based on the position of the aircraft.

In yet another embodiment of the present invention, an aviation signal frequency value nominating device includes a position receiving component that receives position data indicating a position of the aircraft; an aviation data receiving component that receives aviation data associated with a plurality of aviation facilities, wherein the aviation data for each of the plurality of aviation facilities includes an aviation signal having a prescribed frequency value; a nominating component that nominates one of the plurality of aviation facilities as a nominated aviation facility based on a position of the aircraft; and a display for displaying the frequency value of the aviation signal of the nominated aviation facility. If desired, the display may display information corresponding to the nominated aviation facility and/or information corresponding to at least selected ones of the plurality of the aviation facilities in addition to the nominated aviation facility.

In an even more specific embodiment, the aviation data for each of the plurality of aviation facilities includes a plurality of aviation signals, wherein each of the plurality of aviation signals having a prescribed frequency value. In this case the nominating component nominates one of the plurality of aviation signals associated with the nominated aviation facility as a nominated aviation signal likely to be of interest to a pilot, and the display displays the frequency value of the nominated aviation signal. If desired, the display may display frequency values of at least selected ones of the plurality of aviation signals associated with the nominated aviation facility in addition to the frequency value of the nominated aviation signal. In an even more specific embodiment, the display includes a first level display displaying a header associated with the nominated aviation facility and a second level display displaying the frequency value of the nominated aviation signal. In all cases, nomination of an aviation facility and/or signal may be based additionally on aircraft speed, altitude, radial relative to an airport facility, and/or states of the aircraft such as a taxi-in state, a taxi-out state, a departure state, an enroute state or an arrival state.

BRIEF DESCRIPTION OF THE DRAWINGS

FIGS. 11A–11C illustrate a flowchart of a particular embodiment of an algorithm for selecting facilities and frequencies for display;

FIGS. 11A–11B illustrate a flowchart of a particular embodiment of an algorithm for nominating a desired headers and frequencies;

DETAILED DESCRIPTION OF THE EMBODIMENTS

Figure 1:
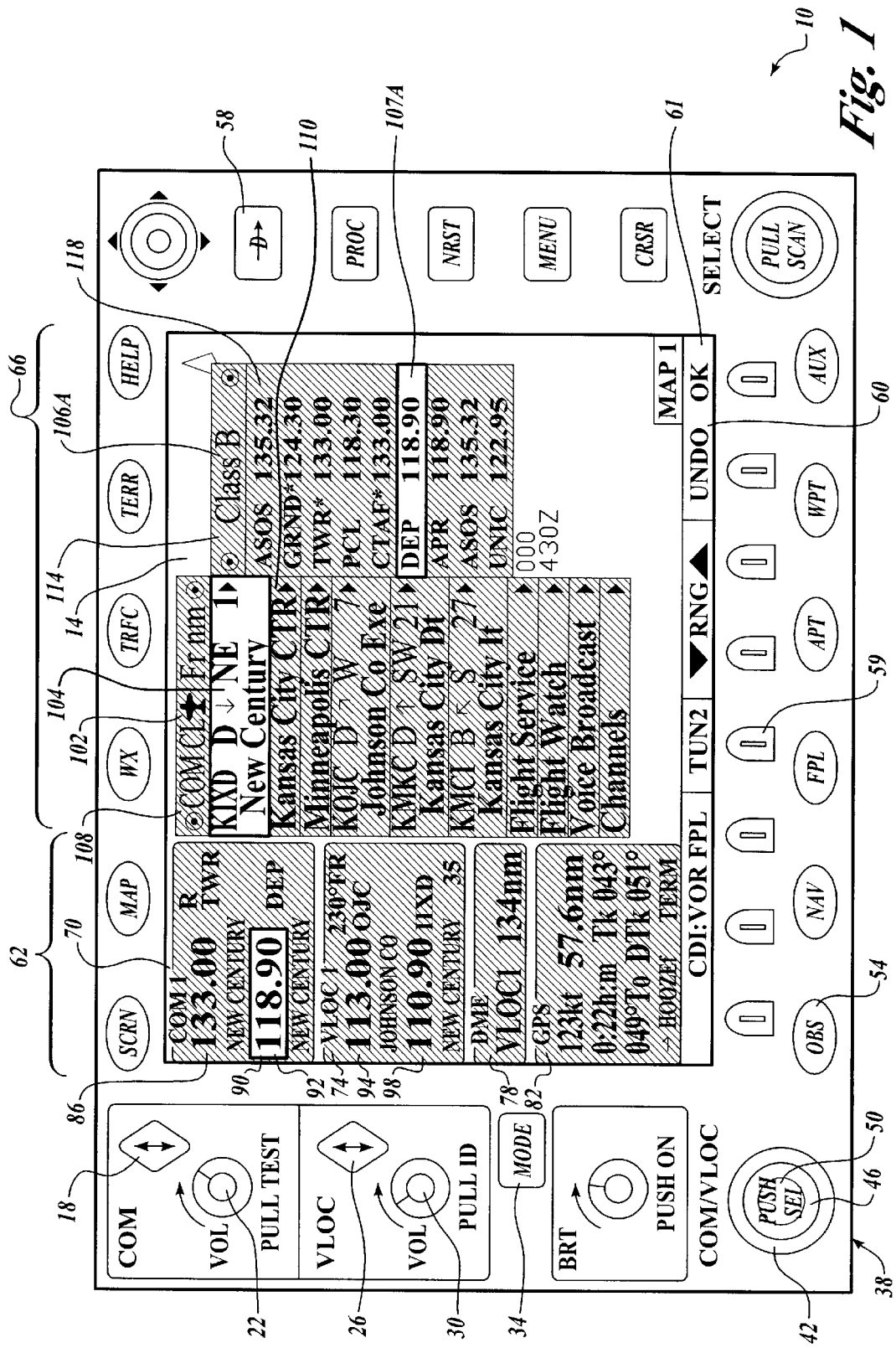
FIG. 1 shows a particular embodiment of a front face of a navcomm device according to the present invention.

FIG. 1 shows a particular embodiment of a front face of a navcomm device 10 according to the present invention. Navcomm device 10 includes a display 14, a communication (COM) frequency transfer switch 18, a COM volume/test control 22 (which controls volume when rotated and defeats the squelch when pulled), a VOR localizer (VLOC) frequency transfer switch 26, a VLOC volume/ID control 30 (which controls volume when rotated and causes the identification code to be heard when pulled), a mode switch 34, a concentric control device 38 comprising a rotatable outer knob 42, a rotatable inner knob 46 and a centrally disposed push button 50, an omni-bearing selector (OBS) button 54, a direct-to button 58, a TUNx (e.g., TUN2) soft key 59, an UNDO soft key 60, and an OK soft key 61. The other buttons and control devices shown are not important to the present invention and will not be described further.

Display 14 includes a left side display portion 62 and a right side display portion 66. The contents of these display portions depends upon the set display mode for navcomm device 10. The display modes relevant to this invention include a standby frequency entry mode, an active frequency entry mode, and a header/frequency nominate mode, and these different display modes will be discussed in more detail below. FIG. 1 shows navcomm device 10 in header/frequency nominate mode.

When in the above modes, left side display portion 62 includes a COM frequency 3o display 70, a VLOC frequency display 74, a distance measuring equipment (DME) display 78, and a GPS display 82. COM frequency display 70 typically displays an active COM frequency 86 (shown as 133.00 in this example) and a standby COM frequency 90. Indicated together with the active COM frequency 86 is the station type (TWR in this example) to the right of the frequency, a status indicator (R for receive) above the station type, and the facility name (New Century) below the frequency. Indicated together with the standby COM frequency 90 is the station type (DEP) to the right of the frequency and the facility name (New Century) below the frequency. The active COM frequency can be swapped with the standby COM frequency, and vice versa, by pressing COM frequency transfer switch 18 in a well known manner. A particular frequency or other field can be selected for further operations by placing a cursor 92 (shown as a highlight in this example) at that frequency or field by pressing push button 50. The standby COM frequency 90 and its associated information usually is not displayed when navcomm device is in the active frequency entry mode.

VLOC frequency display 74 typically displays an active VLOC frequency 94 (shown as 113.00 in this example) and a standby VLOC frequency 98. Indicated together with the active VLOC frequency 94 is the station identifier (OJC in this example) to the right of the frequency, the direction (230°) to or from (FR in this example) the facility above the station identifier, and the facility name (Johnson Co) below the frequency. Indicated together with the standby VLOC frequency 98 is the station identifier (IIXD in this example) to the right of the frequency and the facility name (New Century) below the frequency.

DME display 78 includes an identifier of the source of the station to which distance is being measured (VLOC1 in this example), and the distance to the station (134 nm). GPS display 82 indicates aircraft data such as ground speed (123 kt), distance from the active waypoint (57.6 nm), estimated time of arrival to the waypoint (0:22 h:m), actual track (TK 043°), desired track (DTK 051 °), bearing to and identifier of the waypoint (049° to HOOZEf) and navigation phase (Term).

Figure 3:
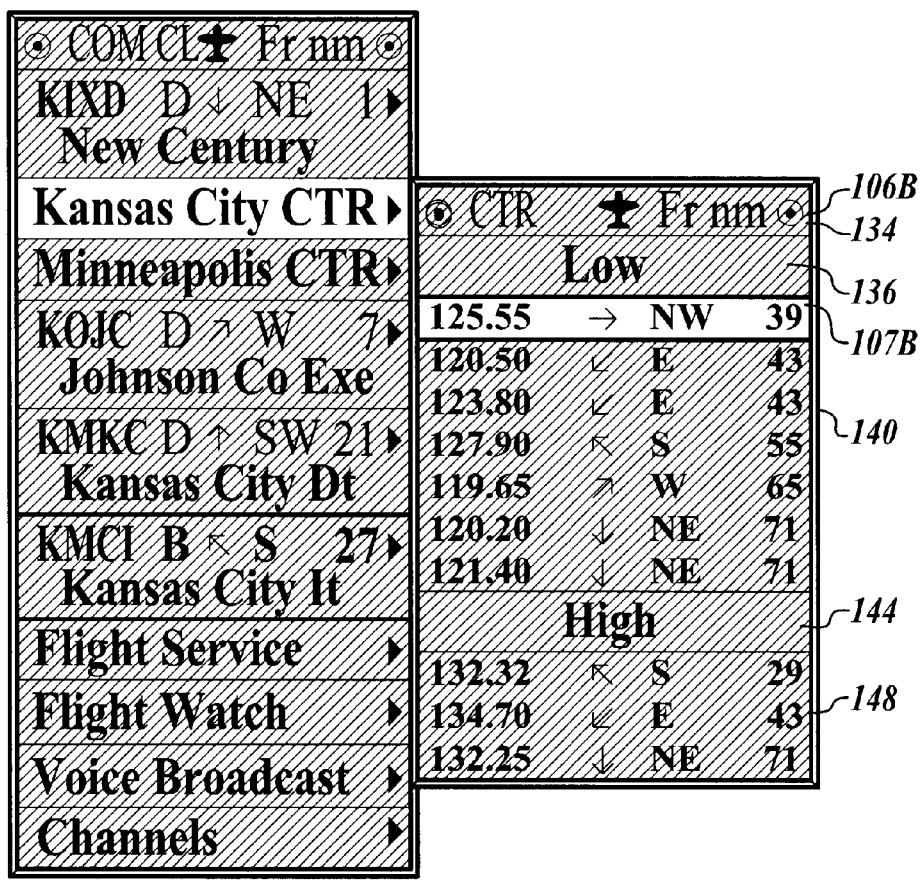
FIG. 3 is a detailed view of the right side display portion showing a particular embodiment of a second level nominate menu for a Center.
Figure 4:
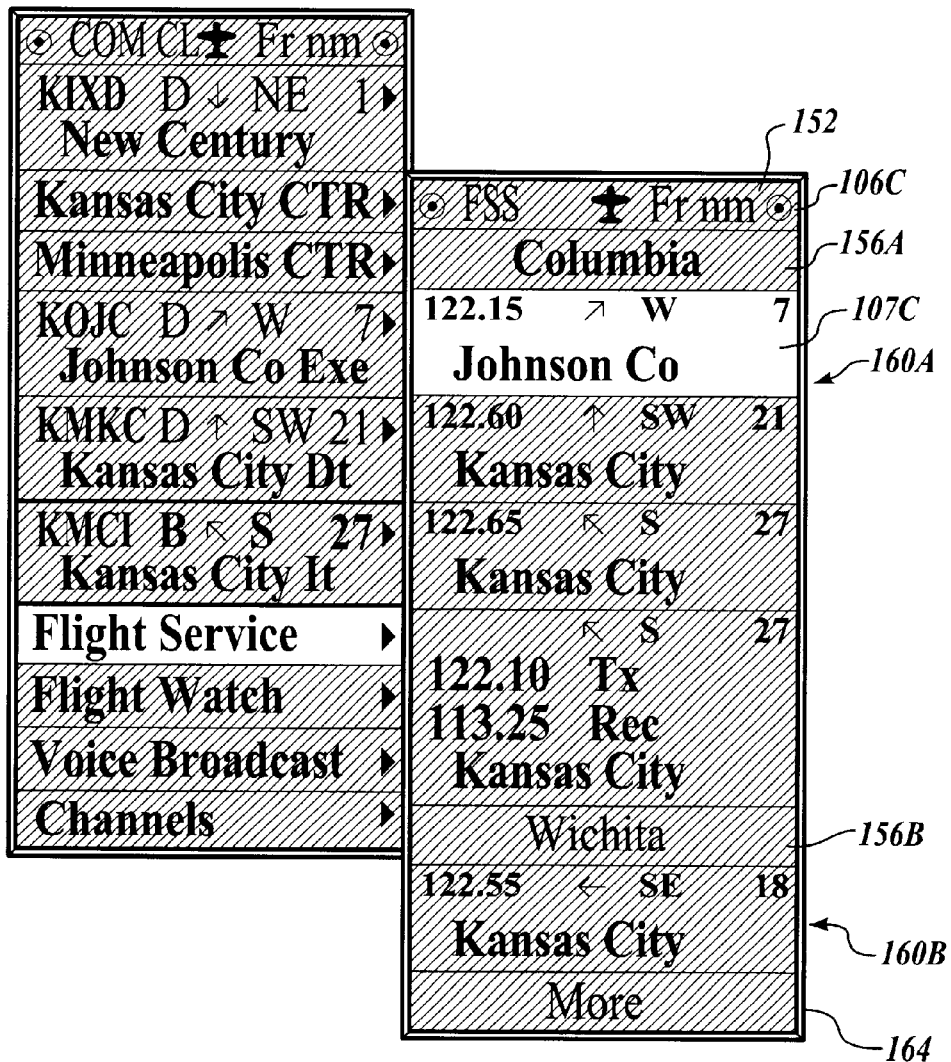
FIG. 4 is a detailed view of the right side display portion showing a particular embodiment of a second level nominate menu for an FSS.
Figure 5:
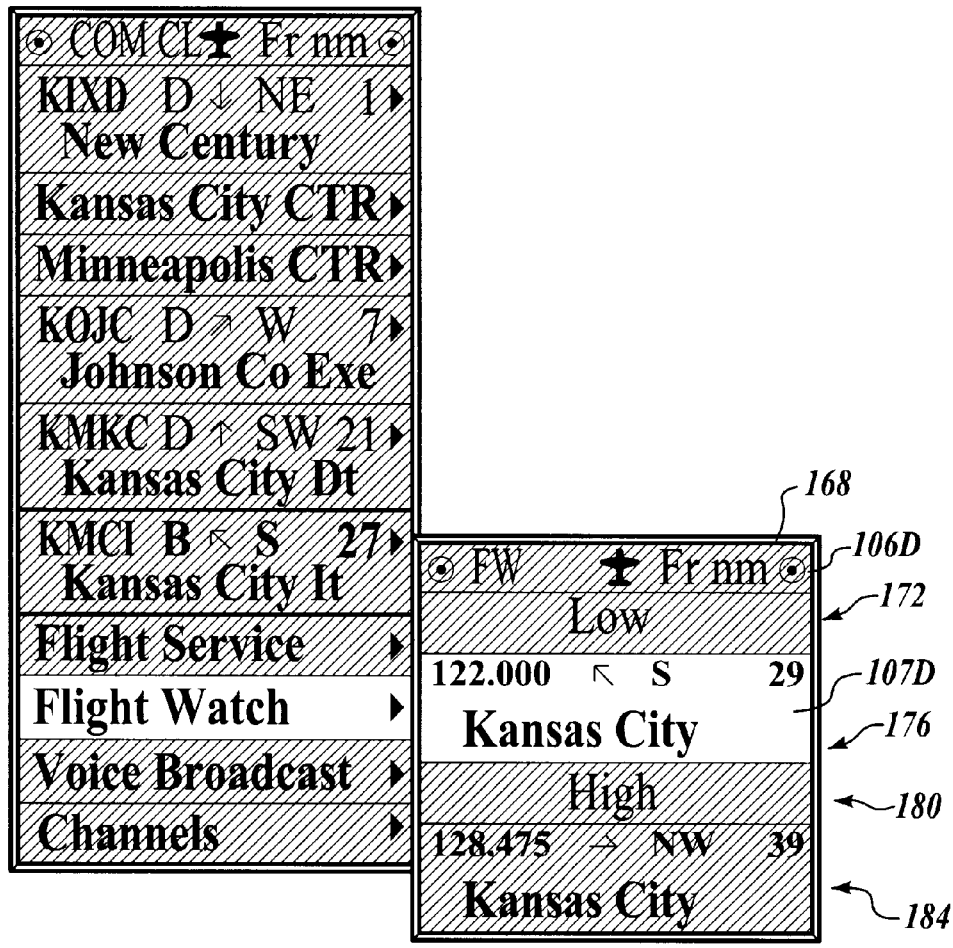
FIG. 5 is a detailed view of the right side display portion showing a particular embodiment of a second level nominate menu for Flight Watch services.
Figure 6:
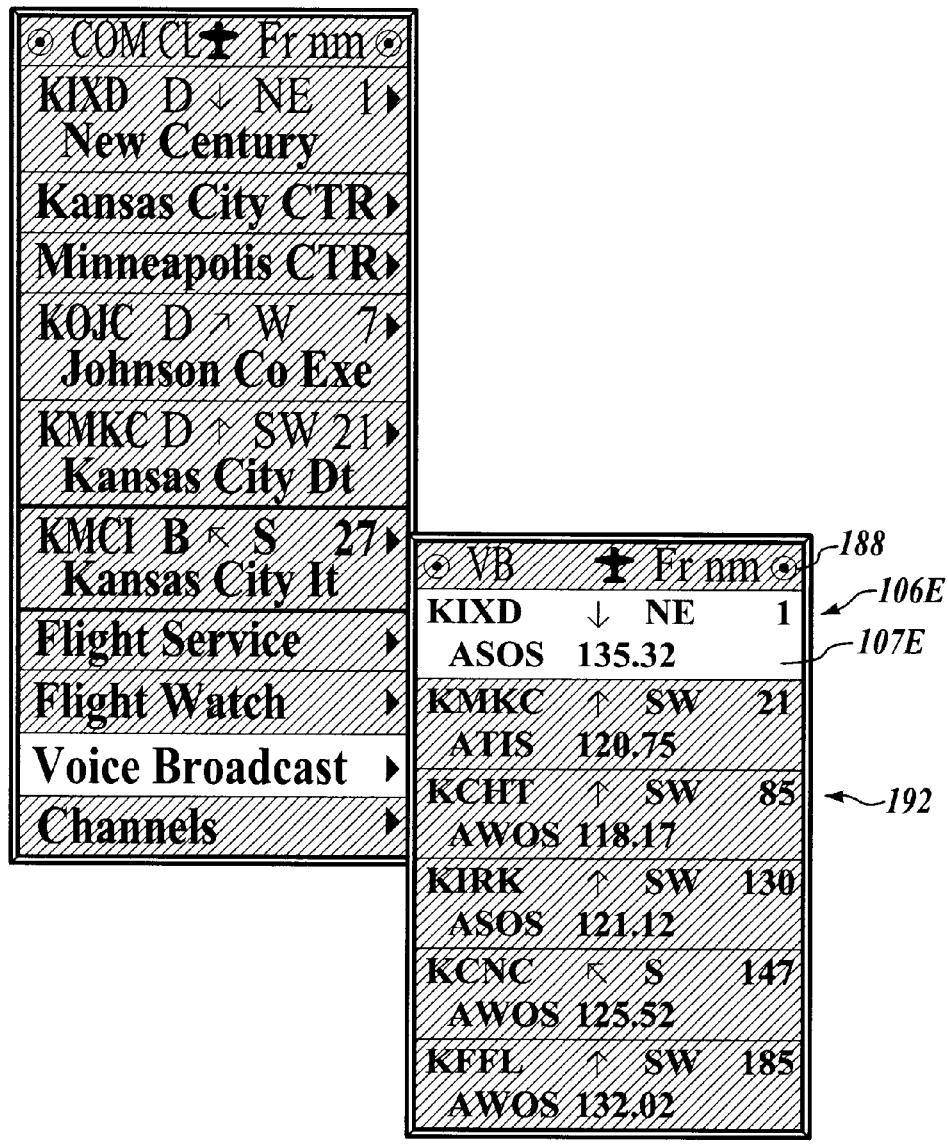
FIG. 6 is a detailed view of the right side display portion showing a particular embodiment of a second level nominate menu for a Voice Broadcast service.
Figure 7:
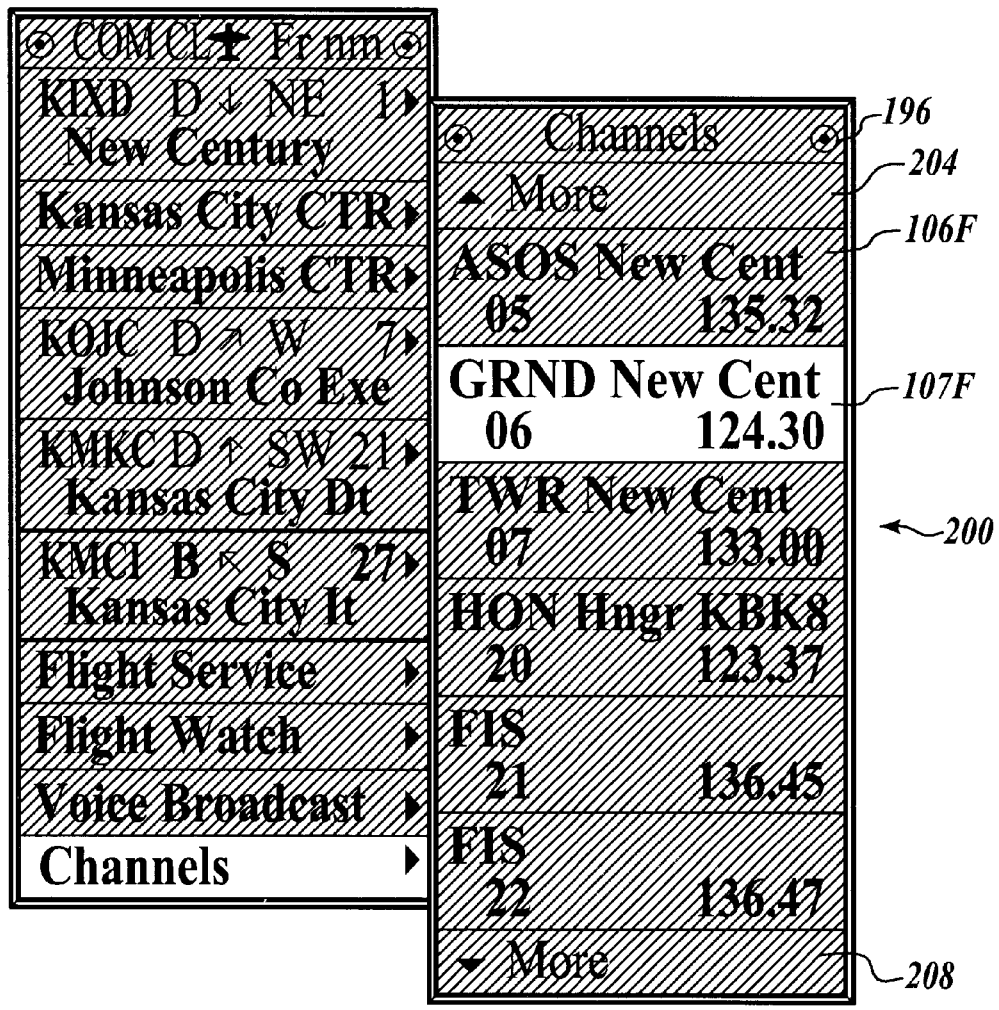
FIG. 7 is a detailed view of the right side display portion showing a particular embodiment of a second level nominate menu for user-defined frequencies.

When navcomm device 10 is in active frequency entry mode or standby frequency entry mode, right side display portion 66 may provide various flight information that is not relevant to the present invention. When navcomm device 10 is in header/frequency nominate mode, right side display portion 66 in this embodiment includes a first level (header) nominate menu 102 and a second level (frequency) nominate menu such as 106A in FIGS. 1 and 2. The format of second level nominate menu differs depending on the selected header. For example, FIG. 3 is a detailed view of right side display portion 66 showing a particular embodiment of a second level nominate menu 106B for a Center, FIG. 4 is a detailed view of right side display portion 66 showing a particular embodiment of a second level nominate menu 106C for an FSS, FIG. 5 is a detailed view of right side display portion 66 showing a particular embodiment of a second level nominate menu 106D for Flight Watch services, FIG. 6 is a detailed view of right side display portion 66 showing a particular embodiment of a second level nominate menu 106E for a Voice Broadcast service, and FIG. 7 is a detailed view of right side display portion 66 showing a particular embodiment of a second level nominate menu 106F for user-defined frequencies.

In this embodiment, first level nominate menu 102 contains a title block 108 and list of headers 110. Title block 108 includes a symbol illustrating that the outer knob 42 of concentric control device 38 controls the selection of headers, the title "COM," a column header "CL" for indicating the airspace class, an aircraft symbol as a graphical bearing pointer column header, "Fr" or "To," and the column header "nm" (nautical miles) or "km" (kilometers). In this embodiment, a header may be one of the following:

1) An airport or terminal radar header, comprising the identifier and name of an airport, a single character airport class designator, a graphical bearing pointer to the airport (e.g., an arrow), direction to or from the airport (an alpha or numeric value), distance to the airport, and a right-indicating arrow pointing to the second level nominate menu 106A associated with this header. In this embodiment, the graphical bearing pointer direction (relative to straight up on the display) is calculated by taking the true course from the present position to the facility and correcting with the present position magnetic variation to create the magnetic course to the facility. The magnetic heading (when available) or magnetic track angle (when magnetic heading is not available) is then subtracted from the magnetic course. The direction relative to the facility is the magnetic course to or from the facility and requires no heading or track for display. The graphical bearing pointer and direction relative to the facility is dashed when they can not be calculated.

2) An Air Route Traffic Control Center (Center) comprising the name of the Center followed by the abbreviation "CTR" and a right-indicating arrow pointing to the second level nominate menu 106B associated with this header."

3) A generic header such as FLIGHT SERVICE," FLIGHT WATCH," "VOICE BROADCAST," OR "CHANNELS" and a right-indicating arrow pointing to the second level nominate menu 106C, 106D, 106E or 106F, respectively, associated with the header. In this embodiment, generic headers are located at the end of the list and are separated from the others by a wider separator, and they are in the order shown. If desired, each such header may appear only if there are frequencies associated with it, or else the header can be displayed whether or not frequencies are associated with it.

If there are more headers than can be displayed at one time, then menu scrolling with a "MORE" designator may be used at the top and/or bottom of the list of airport, terminal radar and Center headers similar to the scrolling headers shown for second level nominate menu 106F in FIG. 7. In this embodiment, all airports and terminal radars along the flight plan and within a selected distance of the route are displayed as set forth in more detail below. Of course, different selection criteria could be applied in different applications. In general, the list of airports, terminal radar and Center headers are listed in the order of proximity to the current aircraft position. A first level nominate menu cursor 104 is located over the header most likely to be of interest to the pilot.

Second level nominate menus 106A–106F generally contain a list of frequencies associated with their corresponding headers, and their formats differ depending upon the header. As shown in FIG. 1, second level nominate menu 106A associated with airports (or terminal radar) contains a title block 114 and a frequency list 118. Title block 114 includes a symbol illustrating that the inner knob 46 of concentric control device 38 controls the selection of frequencies, and text indicating the airspace classification for the airport (e.g., "CLASS D"). Each entry in frequency list 118 provides the station type (e.g., ASOS, GRND, TWR, etc.) and frequency. If the frequency is available only on a part time basis, then an asterisk appears between the station type and the frequency. A second level nominate menu cursor 107A is located over the frequency most likely to be needed by the pilot at that particular time.

Figure 2:
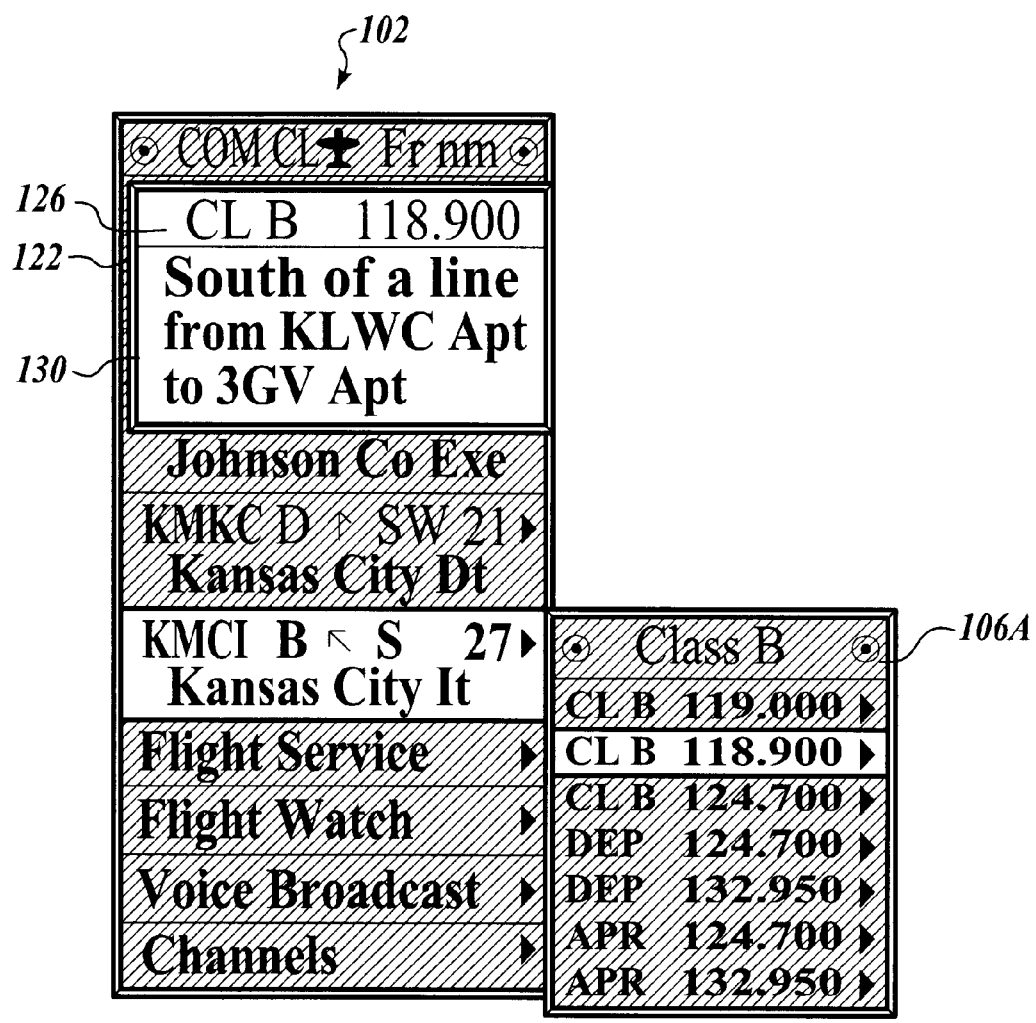
FIG. 2 is a detailed view of the header/frequency nomination page for a Class B airspace showing a particular embodiment of a second level nominate menu including a third level nominate menu for a nominated frequency.

If additional information is associated with the frequency, such as frequency usage, then a right-indicating arrow is located on the right end of the frequency entry as shown in FIG. 2. In that case, a third level menu 122 providing the additional information is superimposed on first level nominate menu 102. Third level menu 122 includes a title block 126 and a text box 130. Title block 126 lists the station type and frequency from second level nominate menu 106A, and text block 130 provides the additional information associated with that frequency.

As shown in FIG. 3, second level nominate menu 106B associated with Centers includes a main title block 134, a low altitude frequency title block 136, a low altitude frequency list 140, a high altitude title block 144, and a high altitude frequency list 148. In this embodiment, up to seven low altitude frequencies and up to three high altitude frequencies each for up to three Centers located near the present position and along the flight route are displayed. Main title block 134 includes a symbol illustrating that the inner knob 46 of concentric control device 38 controls the selection of frequencies, the title "CTR," an aircraft symbol as a graphical bearing pointer column header, "Fr" or "To," and the column header "mn" or "km." Low altitude frequency title block 136 contains the word "LOW." Each entry in low altitude frequency list 140, sorted by proximity to the current aircraft position, includes a frequency, a graphical bearing pointer (e.g., an arrow) to the transmitter for that frequency, the relative bearing to the transmitter for that frequency, and the distance to the transmitter. Similarly, high altitude frequency title block 144 contains the word "HIGH." Each entry in high altitude frequency list 148, sorted by proximity to the current aircraft position, includes a frequency, a graphical bearing pointer (e.g., an arrow) to the transmitter for that frequency, the relative bearing to the transmitter for that frequency, and the distance to the transmitter. A second level nominate menu cursor 107B is located over the nearest frequency most likely to be needed by the pilot at that particular time based on current altitude.

As shown in FIG. 4, second level nominate menu 106C associated with Flight Service Stations (FSS's) includes a main title block 152, one or more FSS facility title blocks 156A, 156B, etc., and a frequency list 160A, 160B, etc. associated with each FSS facility title block. In this embodiment, up to five frequencies each for up to two FSS's are displayed. Main title block 152 includes a symbol illustrating that the inner knob 46 of concentric control device 38 controls the selection of frequencies, the title "FSS," an aircraft symbol as a graphical bearing pointer column header, "Fr" or "To," and the column header "nm" or "km." Each FSS facility title block 156A and 156B contains the name of the FSS facility associated with its following frequency list 160A and 160B. For example, FSS facility title block 156A includes the word "COLUMBIA" to indicate the Columbia FSS, and FSS facility title block 156B includes the word "WICHITA" to indicate the Wichita FSS. Each entry in frequency lists 160A and 160B includes a frequency, the name of the substation associated with that frequency, a graphical bearing pointer to the substation (e.g., an arrow), the relative direction to the substation, the distance to the substation, and the name of the substation. If separate transmit and receive frequencies are associated with a particular substation, then the frequencies are separately listed together with the indicator "TX" (transmit) or "REC" (receive) as indicated for the last entry for the Columbia substation. If all the frequencies can not be displayed on the screen at one time, then a scroll header 164 with the word "MORE" and a downward pointing arrow is disposed at the bottom of the display, and standard scrolling techniques may be used to view the remaining frequencies. A similar scroll header would be displayed immediately below main title block 152 if second level nominate menu 106C displays frequencies in the middle of a long list. The entries in second level nominate menu are sorted by proximity to the aircraft, wherein the FSS that contains the frequency closest to the current aircraft position is listed first. A second level nominate menu cursor 107C is located over the nearest frequency most likely to be needed by the pilot at that particular time based on the current position of the aircraft.

As shown in FIG. 5, second level nominate menu 106D associated with the Flight Watch services of nearby FSS's includes a main title block 168, a low altitude frequency title block 172, a low altitude frequency list 176, a high altitude title block 180, and a high altitude frequency list 184. In this embodiment, second level nominate menu 106D displays the single nearest low altitude frequency and the single nearest high altitude frequency for the Flight Watch service. Main title block 168 includes a symbol illustrating that the inner knob 46 of concentric control device 38 controls the selection of frequencies, the title "FW," an aircraft symbol as a graphical bearing pointer column header, "Fr" or "To," and the column header "nm" or "km." Low altitude frequency title block 172 contains the word "LOW." The entry in low altitude frequency list 176 includes a frequency, a graphical bearing pointer to the transmitter for that frequency (e.g., an arrow), the relative bearing to the transmitter for that frequency, the distance to the facility, and the name of the facility. Similarly, high altitude frequency title block 180 contains the word "HIGH." The entry in high altitude frequency list 184 includes a frequency, a graphical bearing pointer to the transmitter for that frequency (e.g., an arrow), the relative bearing to the transmitter for that frequency, the distance to the facility, and the name of the facility. A second level nominate menu cursor 107D is located over the frequency most likely to be needed by the pilot at that particular time based on the current altitude of the aircraft.

As shown in FIG. 6, second level nominate menu 106E associated with Voice Broadcast services includes a main title block 188 and a frequency list 192. In this embodiment, up to seven voice broadcast frequencies distributed along the flight route are displayed. Main title block 188 includes a symbol illustrating that the inner knob 46 of concentric control device 38 controls the selection of frequencies, the title "VB," an aircraft symbol as a graphical bearing pointer column header, "Fr" or "To," and the column header "nm" or "km." Each entry in frequency list 192 includes the name of the facility providing the voice broadcast, a graphical bearing pointer to the voice broadcast facility (e.g., an arrow), the relative bearing to the transmitter for that facility, the distance to the facility, the name of the service offered, and the frequency. A second level nominate menu cursor 107E is located over the frequency most likely to be needed by the pilot at that particular time based on the proximity to the current position of the aircraft.

As shown in FIG. 7, second level nominate menu 106F associated with user-defined Channels includes a main title block 196 and a frequency list 200. In this embodiment, main title block 196 includes a symbol illustrating that the inner knob 46 of concentric control device 38 controls the selection of frequencies and the title "CHANNELS." In this case, more frequencies exist than can be displayed at one time, so scroll headers 204 and 208 are located at the top and bottom of frequency list 200. Each entry in frequency list 200 includes the name of the service, the name of the facility providing the service, a user-defined sequence number, and the frequency. The list is sorted by sequence number. While in some embodiments the frequency list is merely displayed, in other embodiments the next user-defined frequency after the last-accepted or transferred frequency could be nominated. A second level nominate menu cursor 107F is located over the frequency selected by the pilot or nominated by the system.

In general, airport frequencies are displayed in the order shown below in Table 1.

TABLE 1

| ALL AIRPORTS | CLASS D | CLASS E AND G | ARINC 424 DESIGNATOR |
|---|---|---|---|
| ASOS | | | ASO |
| AWOS | | | AWO |
| ATIS | | | ATI |
| PTAX | | | CPT |
| CLR | | | CLD |
| RAMP | | | RMP |
| GRND | | | GND |
| TWR | | | TWR |
| | PCL | | PCL |
| AAS | | | AAS |
| AFIS | | | AFIS |
| RDO | | | RDO |
| ATF | | | ATF |
| CTAF | | | CTAF |
| MF | | | MF |
| | | UNIC | UNI |
| | | MCOM | MUL |
| | | PCL | PCL |
| CL B | | | TCA |
| CL C | | | TRS |
| TRSA | | | TRS |
| CTA | | | CTA |
| TMA | | | TMA |
| DEP | | | DEP |
| RDR | | | RDR |
| CTR | | | ACC & CTL |
| APR | | | APP |
| ARVL | | | ARR |
| DIR | | | DIR |
| ATIS | | | ATI |
| AWOS | | | AWO |
| ASOS | | | ASO |
| | | UNIC | UNI |
| | | MCOM | MUL |

As noted previously, for the purpose of this invention, navcomm device 10 may be placed into three operating modes or states: a header/frequency nominate mode, a standby frequency entry mode, and an active frequency entry mode. FIGS. 1–7 illustrated various data displays when navcomm device 10 is in the frequency nominate mode. The purpose of this mode is to highlight a frequency that a pilot most likely will need at a particular time and to facilitate selection of this frequency as either the active frequency 86 or the standby frequency 90, or to transfer the selected frequency to another device. In this embodiment, typically this is accomplished by automatically highlighting the header representing the facility closest to the current position of the aircraft and by automatically highlighting the frequency most likely to be used by the pilot based on aircraft position, altitude, ground speed and heading. The criteria used for determining which frequency to highlight was discussed briefly above and will be discussed further below. If desired, the pilot may highlight a different header in first level nominate menu 102 by moving first level nominate menu cursor 104 with outer knob 42 of concentric control device 38, and the pilot may highlight a different frequency in second level nominate menus 106A–106C by moving second level nominate menu cursors 107A–107C respectively with inner knob 46 of concentric control device 38.

Figure 8:
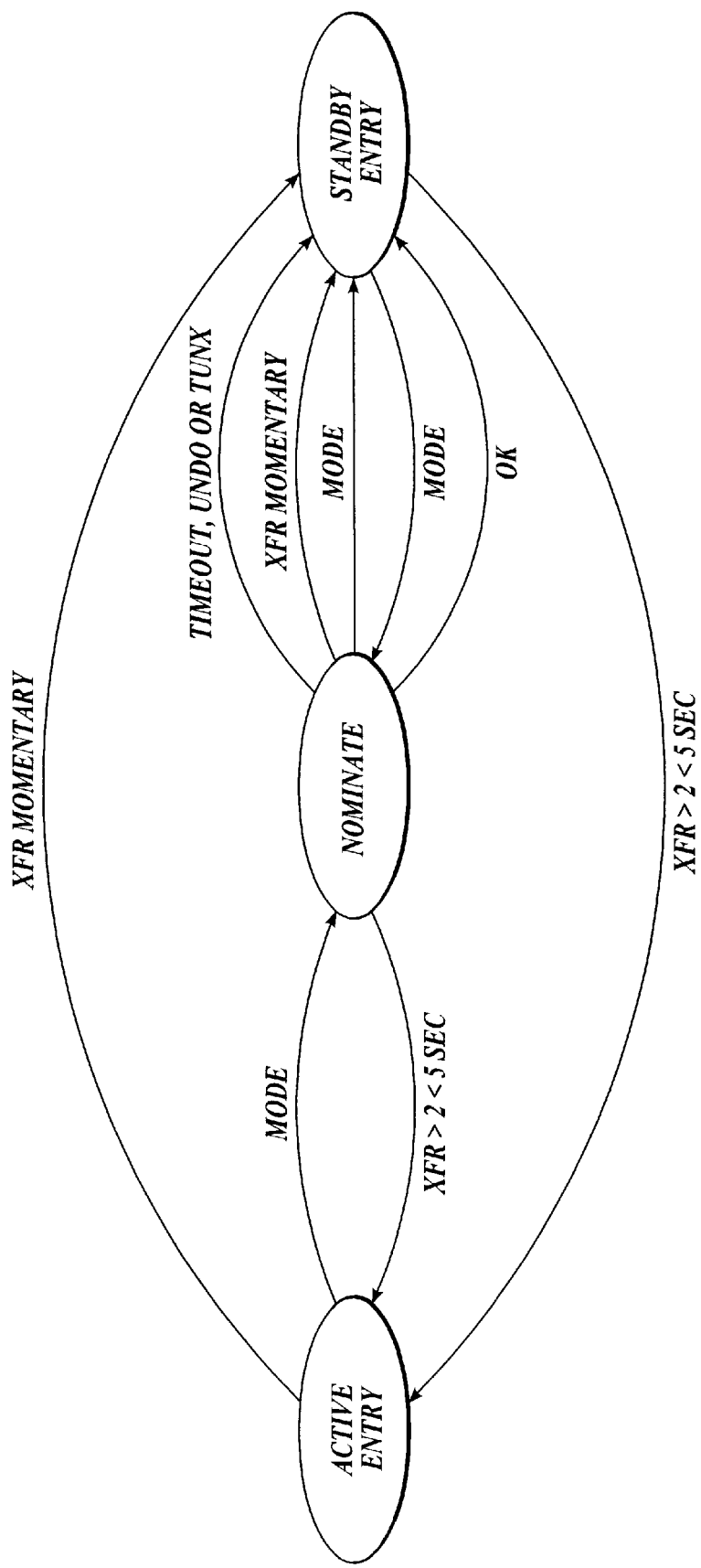
FIG. 8 is a state diagram for header/frequency nominate, standby frequency entry and active frequency entry modes for the navcomm device.

FIG. 8 is a state diagram showing the header/frequency nominate mode, the standby frequency entry mode, and active frequency entry modes for navcomm device 10. When navcomm device 10 is in the standby frequency entry mode, cursor 92 ordinarily is on standby frequency 90. At that time the megahertz portion of standby frequency 90 may be changed by rotating outer knob 42 of concentric control device 38, and the kilohertz portion of standby frequency 90 may be changed by rotating inner knob 46 of concentric control device 38.

Pressing mode button 34 when navcomm device 10 is in the standby frequency entry mode causes navcomm device 10 to move to the header/frequency nominate mode. At that time, first level nominate menu 102 and one of second level nominate menus 106A–106F are displayed, with the first level nominate menu cursor 104 automatically located on the header most likely to be of interest to the pilot and the second level nominate cursor 107A–107E located on the frequency most likely to be of interest to the pilot. Cursor 92 is still located on standby frequency 90, but in this mode the frequency highlighted in second level nominate menus 106A–106F appears as the standby frequency. If no further action is taken (no knob or button activity), then a timeout occurs and navcomm device 10 returns to standby frequency entry mode with the old standby frequency. Navcomm device 10 also would return to standby frequency entry mode with the old standby frequency if the pilot pressed UNDO soft key 60. If the pilot momentarily presses COM frequency transfer switch 18, the nominated frequency (118.90 in FIG. 1) is transferred to the active frequency 86, the previous active frequency (133.00) is transferred to the standby frequency 90, and navcomm device 10 enters standby frequency entry mode. Alternatively, if the pilot merely presses mode switch 34 or OK soft key 61, the nominated frequency remains as standby frequency 90 (the old standby frequency is replaced), and navcomm device 10 enters the standby frequency entry mode. Pressing TUNx soft key 59 communicates the nominated frequency to another device and returns navcomm device 10 to standby frequency entry mode with the old standby frequency.

The pilot can switch to the active frequency entry mode by pressing COM transfer switch 18 for greater than 2 seconds and less than 5 seconds when navcomm device 10 is in either the standby frequency entry mode or the header/frequency nominate mode. At that time, cursor 92 is located on active frequency 86, the megahertz portion of active frequency 86 may be changed by rotating outer knob 42 of concentric control device 38, and the kilohertz portion of active frequency 86 may be changed by rotating inner knob 46 of concentric control device 38. When in active frequency entry mode, momentarily pressing COM transfer switch 18 causes navcomm device 10 to move to the standby frequency entry mode (no transfer occurs), and pressing mode button 34 causes navcomm device 10 to move to the header/frequency nominate mode.

Figure 9:
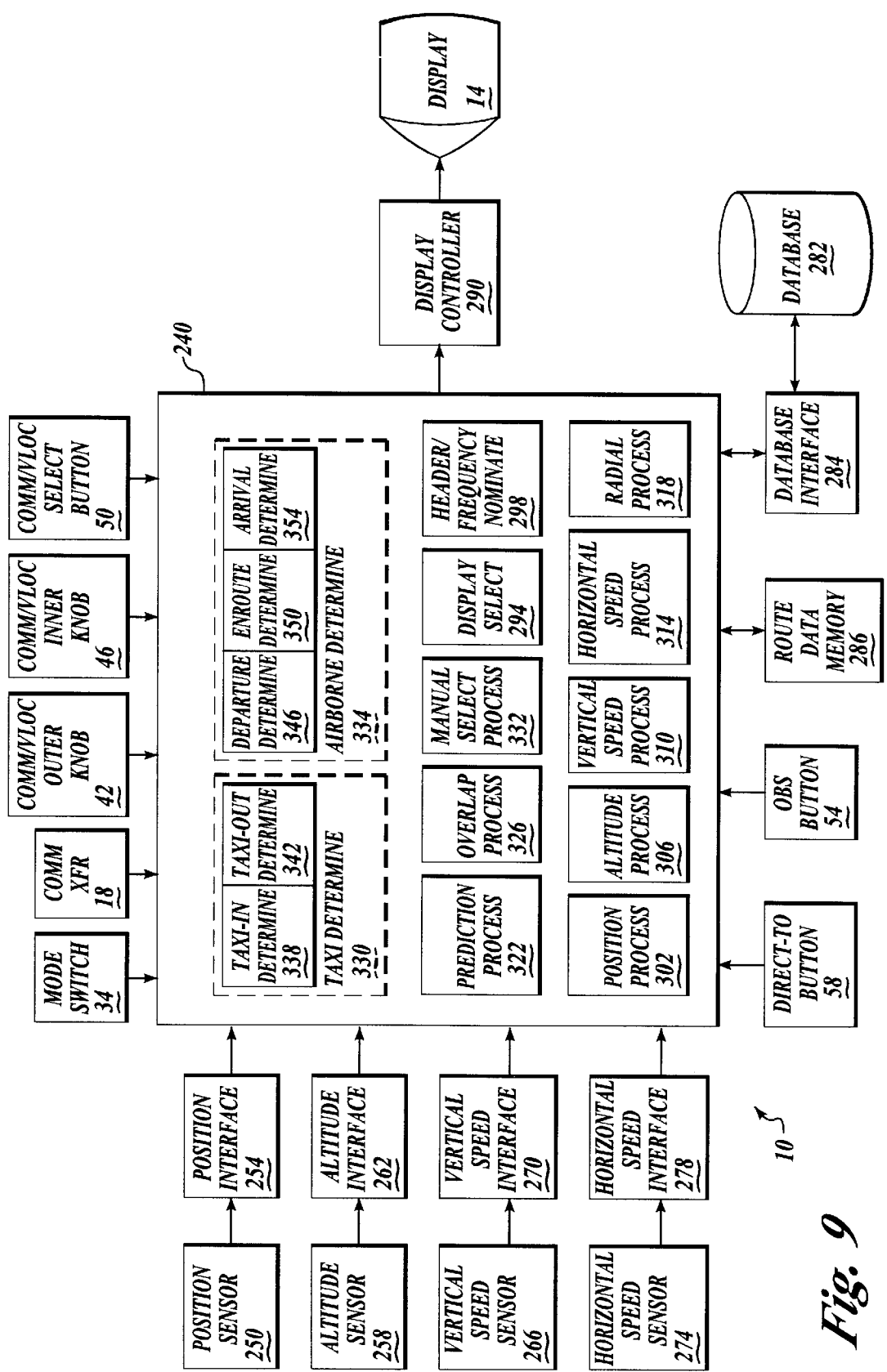
FIG. 9 is a block diagram illustrating a particular embodiment of relevant components of the navcomm device according to the present invention.

FIG. 9 is a block diagram illustrating a particular embodiment of relevant components of navcomm device 10. In addition to the components described above, navcomm device 10 includes a processor 240 that receives position information from a position sensor 250 through a position interface 254, altitude information from an altitude sensor 258 through an altitude interface 262, vertical speed information through a vertical speed sensor 266 through a vertical speed interface 270, and horizontal (ground or airspeed) information from a horizontal speed sensor 274 through a horizontal speed interface 278. These components are of well known design. Communication data including the frequencies associated with the various communication sources discussed above may be obtained from a database 282 through a database interface 284. The information in database 282 is well known and readily available from Jeppesen-Sanderson, Inc. Processor 240 stores and retrieves route data selected from database 282 in a route data memory 286, and it controls display 14 through a display controller 290. These components, too, are of well known design.

A display select component 294 selects header and frequency data from database 282 for display on display 14, and a header/frequency nominate component 298 nominates the header and/or frequency that a pilot most likely would want to use during aircraft operation. For performing their respective tasks, display select component 294 and header/frequency nominate component 298 employ the processing abilities of a position process component 302 for selecting and/or nominating a header or frequency based on a current position of the aircraft, an altitude process component 306 for selecting an/or nominating a header or frequency based on a current altitude of the aircraft, a vertical speed process component 310 for selecting and/or nominating a header or frequency based on a current vertical speed (or possibly acceleration) of the aircraft, a horizontal speed process component 314 for selecting and/or nominating a header or frequency based on a current horizontal speed (or possibly acceleration) of the aircraft, and a radial process component 318 for selecting and/or nominating a header or frequency based on a current radial position or heading of the aircraft (relative to north or a waypoint). Display select component 294 and header/frequency nominate component 298 also employ a prediction process component 322 for predicting a possible encounter with a controlled airspace, an overlap process component 326 for handling overlapping controlled airspaces, and a manual select process component 332 for handling nominations where the pilot manually selects a header or frequency.

Figure 11A:
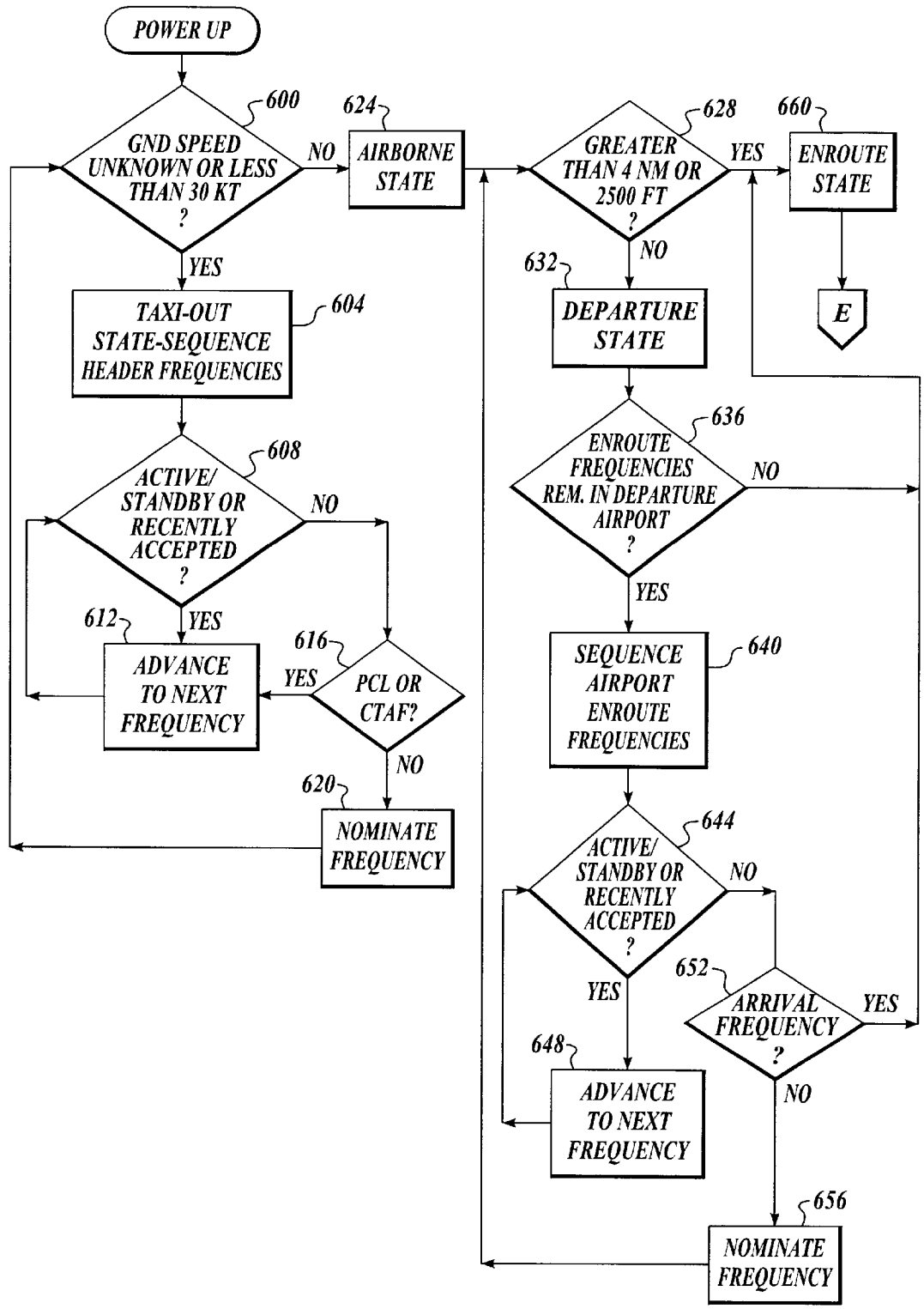
Figure 11B:
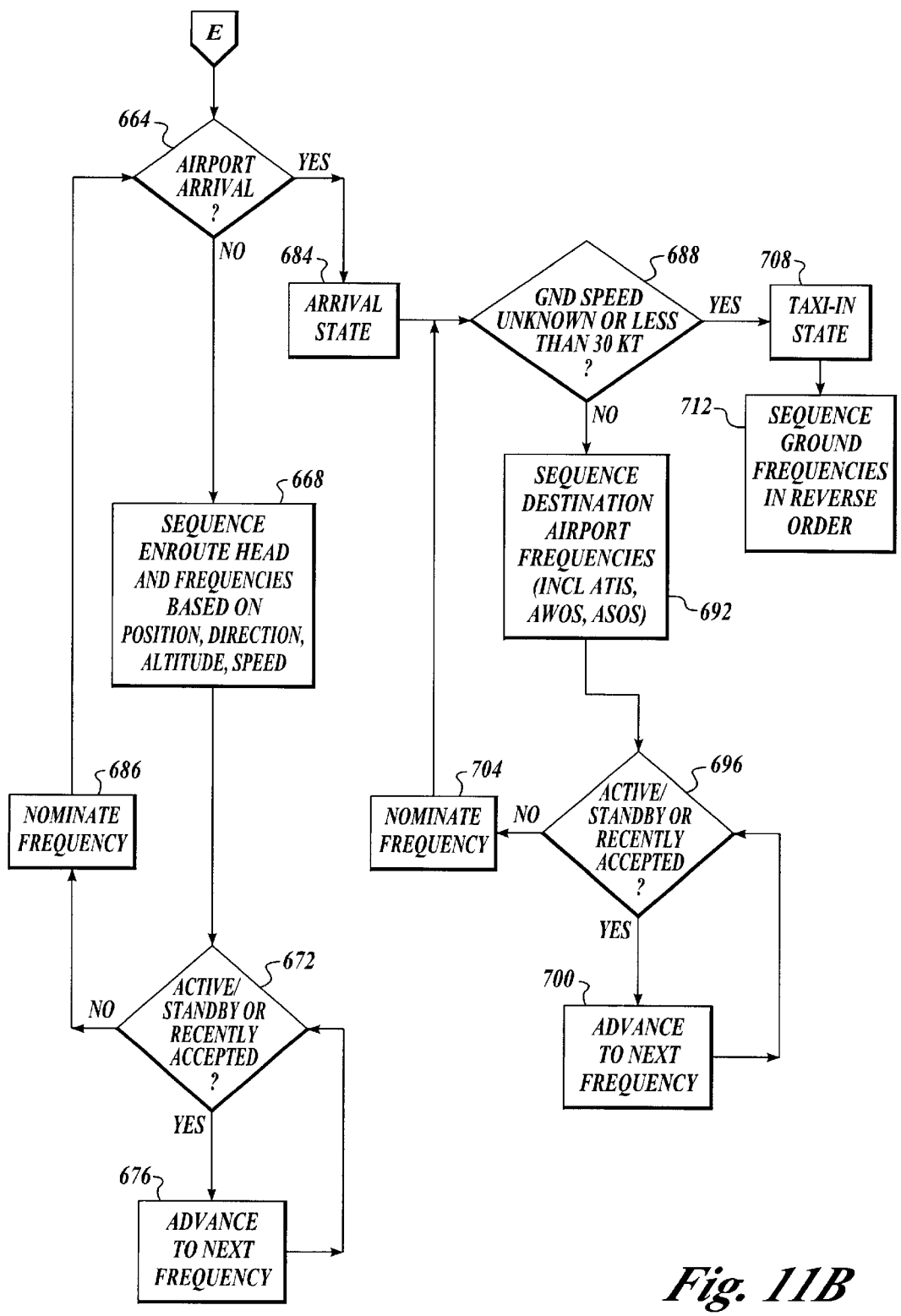

Header/frequency nominate component 298 further processes the selected headers and frequencies based on a current state of the aircraft. Accordingly, processor 240 further includes a taxi state determining component 330 and an airborne state determining component 334. In general, it is assumed the aircraft is in the taxi state when it has a ground speed less than 30 kt, and it is assumed the aircraft is in the airborne state when it has a ground speed greater than 30 kt. Of course, other speed values or criteria could be made for this determination. Taxi state determining component 330 includes a taxi-in state determining component 338 and a taxi-out state determining component 342. Airborne state determining component 334 includes a departure state determining component 346, an enroute state determining component 350 and an arrival state determining component 354. The role of these components will become apparent when discussing FIGS. 11A and 11B. The above components preferably are portions of computer programs running within processor 240.

Figure 10A:
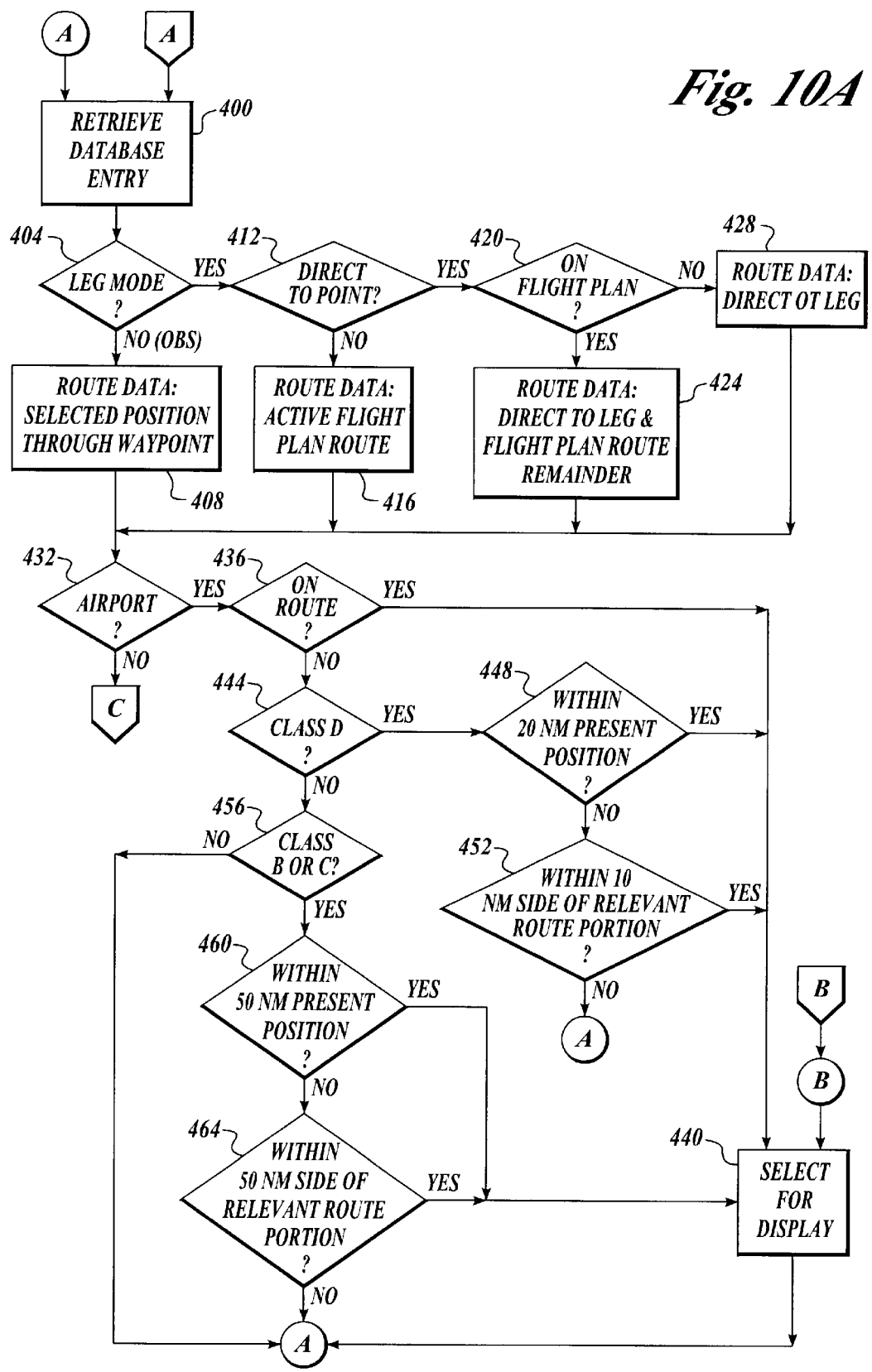
Figure 10B:
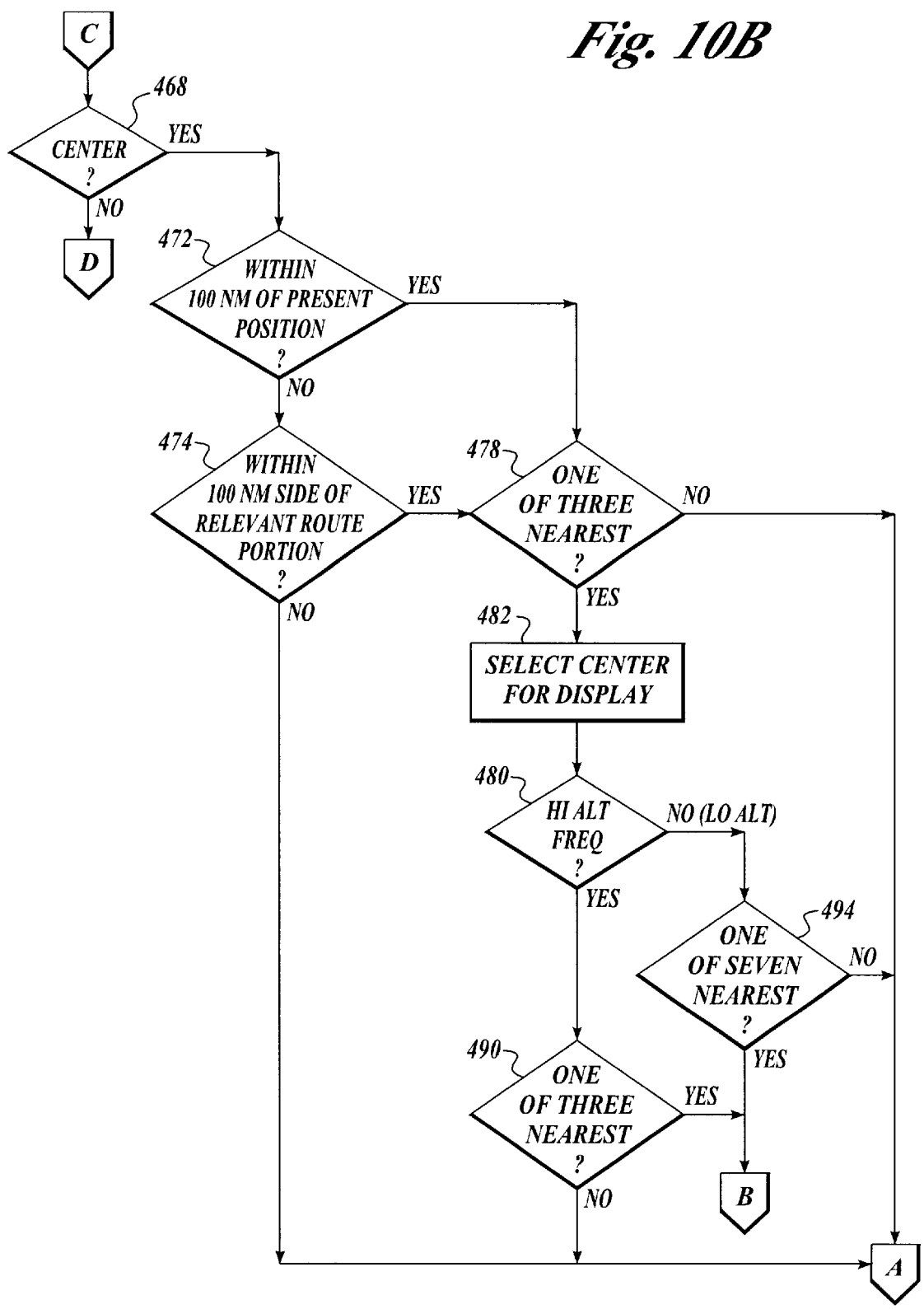
Figure 10C:
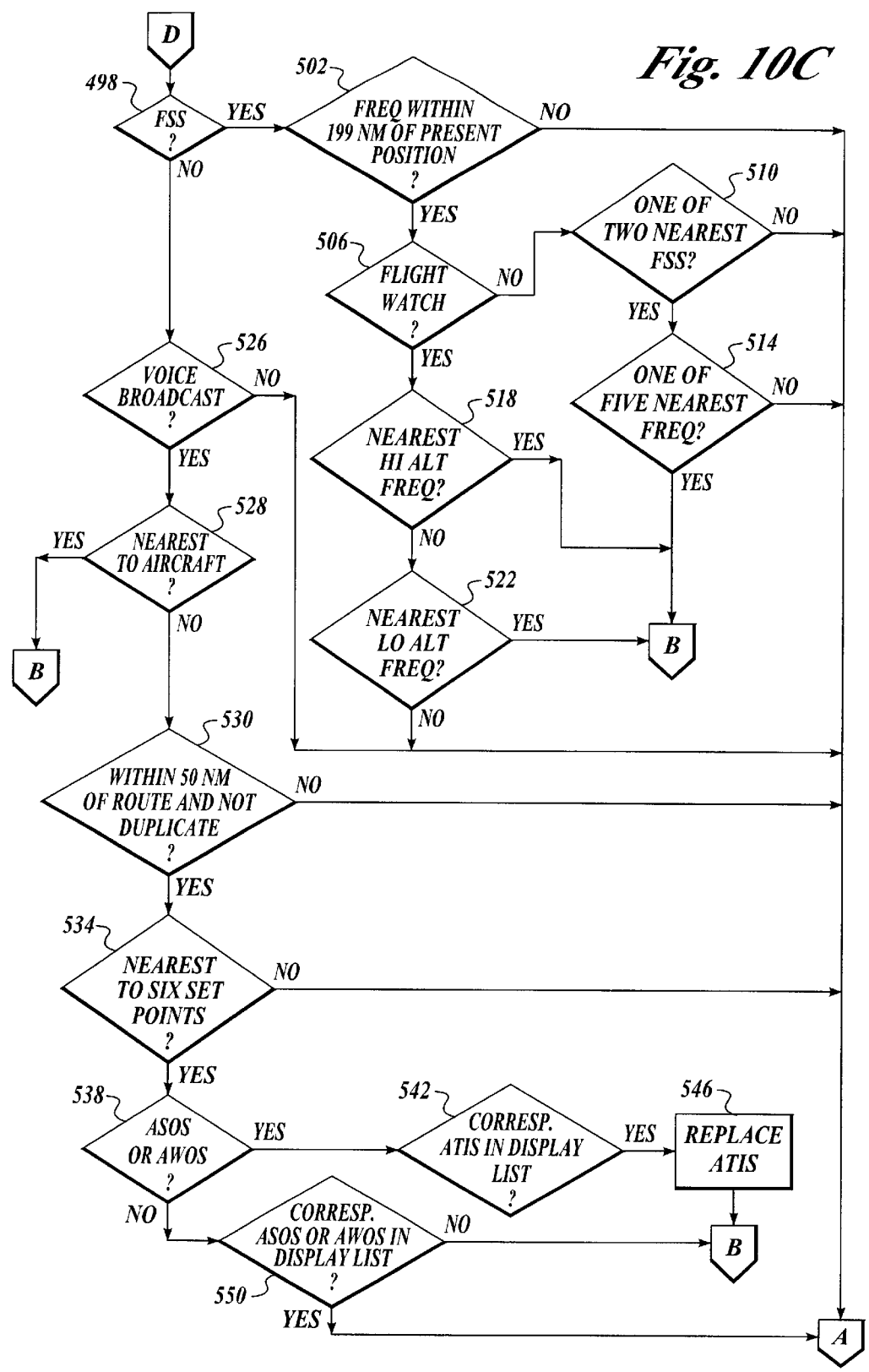

FIGS. 10A–10C illustrate a flowchart of a particular embodiment of an algorithm for selecting headers and frequencies for display. The algorithm typically is performed by display select component 294. In this as in all programs, various flags and process controls are set forth to control processing of initial and final database entries as well as sorting and special situations. Before proceeding directly to the process steps, it should be explained that processor 240 initially determines the route data that will be used to select the relevant frequencies. The route data will depend on which route mode navcomm device 10 is operating in. In general, there are two major route modes: leg mode and omnibearing select (OBS) mode. Leg mode is the default route mode for navcomm device 10, and in this mode the route data is determined by the great circle path between successive waypoints on the flight plan entered by the pilot into navcomm device 10. That is, the route data corresponds to the shortest distance between successive waypoints located on the curved surface of the earth. In addition to a regular leg mode, where navcomm device 10 merely follows the flight plan, there is a direct-to leg mode set by pressing direct-to button 58. If the pilot specifies a direct-to waypoint on the flight plan, then the route data comprises the direct path from the current position to the selected waypoint together with the succeeding points on the flight plan. If the pilot specifies a direct-to waypoint off of the flight plan, then the route data comprises the direct path to the selected waypoint. In OBS mode, the pilot, during the flight, presses OBS button 54 and selects a different course (typically by specifying the heading) to an active waypoint. The route data then comprises the path from the selected position through the waypoint using the selected heading. The foregoing modes are well known and implemented, for example, in a Bendix/King Model KLN 89B GPS Navigation System. A further description of these modes may be found in the Pilot's Guide for the Bendix/King Model KLN 89B GPS Navigation System, incorporated herein by reference. That reference also provides a glossary for the acronyms and abbreviations used herein.

With that background in mind, processor 240 first retrieves a database entry in a step 400. It is then ascertained in a step 404 whether navcomm device 10 is operating in a leg mode. If not, it is assumed that navcomm device 10 is operating in OBS mode, and the route data comprising the path from the current position through the selected waypoint using the selected heading is stored in route data memory 286 in a step 408. If navcomm device 10 is operating in leg mode, it is then ascertained in a step 412 whether navcomm device 10 is operating in leg mode direct to a point. If not, then navcomm device 10 is operating in regular leg mode, and the route data comprising the path along the flight plan is stored in route memory 286 in a step 416. If navcomm device 10 is operating in leg mode direct to a point, it is then ascertained in a step 420 whether the direct-to point is on the flight plan. If so, then the route data comprising the direct path from the current position to the selected waypoint together with the succeeding points on the flight plan is stored in route data memory 286 in a step 424. If the direct-to point is not on the flight plan, then the route data comprising the direct path to the selected waypoint is stored in route data memory 286 in a step 428. Once the route data is stored in route data memory in either steps 408, 416, 424 or 428, it is then ascertained in a step 432 whether the retrieved database entry corresponds to an airport. If so, it is then ascertained in a step 436 whether the airport is on the route described by the route data. If so, then the airport data is selected for display in a step 440, and processing proceeds with the selection of another database entry in step 400.

If it is determined in step 436 that the airport is not on the flight route, it is then ascertained in a step 444 whether the airport is located in Class D airspace. If so, it is further ascertained in a step 448 whether the airport is located within 20 nm of the current position of the aircraft. If so, then the airport data is selected for display in step 440, and processing proceeds with the selection of another data base entry in step 400. However, if the airport is not within 20 nm of the current position of the aircraft, it is then ascertained in a step 452 whether the airport is within 10 nm of either side of a relevant portion of the flight route. In this embodiment, the relevant portion of the flight route extends 50 nm behind and 199 nm ahead of the aircraft along the flight route but not more than 50 nm beyond the end of the route. If so, then the airport data is selected for display in step 440, and processing proceeds with the selection of another data base entry in step 400. If the airport is not within 10 nm of either side of the relevant portion of the flight route, then the airport data is discarded and processing proceeds with the selection of another data base entry in step 400.

If it is determined in step 444 that the airport is not in Class D airspace, it is then ascertained in a step 456 whether the airport is located in either Class B or Class C airspace. If so, it is further ascertained in a step 460 whether the airport is located within 50 nm of the current position of the aircraft. If so, then the airport data is selected for display in step 440, and processing proceeds with the selection of another data base entry in step 400. However, if the airport is not within 50 nm of the current position of the aircraft, it is then ascertained in a step 464 whether the airport is within 50 nm of either side of a relevant portion of the flight route. As in the process for the Class D airspace above, the relevant portion of the flight route extends 50 nm behind and 199 nm ahead of the aircraft along the flight route but not more than 50 nm beyond the end of the route. If the Class B or C airspace is so located, then the airport data is selected for display in step 440, and processing proceeds with the selection of another data base entry in step 400. If the airport is not within 50 nm of either side of the relevant portion of the flight route, or if it is determined that the airport was not in Class B or C airspace in step 456, then the airport data is discarded and processing proceeds with the selection of another data base entry in step 400.

If it is determined in step 432 that the retrieved database entry does not correspond to an airport, it is then ascertained in a step 468 (FIG. 10B) whether the database entry corresponds to a Center. If so, it is then ascertained in a step 472 whether the center is located within 100 nm of the current position of the aircraft. If not, it is then ascertained in a step 474 whether the Center is located within 100 nm on either side of a relevant portion of the flight route. As in the above processes for the airport data, the relevant portion of the flight route extends 50 nm behind and 199 nm ahead of the aircraft along the flight route but not more than 50 nm beyond the end of the route. If neither condition is met, the Center data is discarded and processing proceeds with the selection of another data base entry in step 400. However, if either of these conditions is met, it is then ascertained in a step 478 whether the Center is one of the three nearest centers currently selected for display. If so, then that Center is selected for display in a step 482, replacing a previously selected Center, if necessary.

Thereafter, it is ascertained in a step 480 whether the frequency associated with the center is a high altitude frequency. If so, it is then ascertained in a step 490 whether the transmitter for that frequency is one of the three nearest encountered for that Center. If so, the frequency is selected for display in step 440, possibly replacing a previously selected frequency, if necessary. If the frequency associated with the center is not a high altitude frequency, then it is a low altitude frequency, and it is then ascertained in a step 494 whether the transmitter for that frequency is one of the seven nearest encountered for that Center. If so, the frequency is selected for display in step 440, possibly replacing a previously selected frequency, if necessary. If not, the database entry is discarded. In any event, case processing continues with the retrieval of the next database entry in step 400.

If it is determined in step 468 that the retrieved database entry does not correspond to a Center, it is then ascertained in a step 498 (FIG. 10C) whether the database entry corresponds to an FSS. If the database entry does correspond to an FSS, it is then ascertained in a step 502 whether the transmitter for that frequency is located within 199 nm of the current position of the aircraft. If not, the database entry is discarded and processing continues in step 400. If the transmitter is located within 199 nm, it is then ascertained in a step 506 whether the frequency corresponds to a Flight Watch service for that FSS. If so, it is then ascertained in steps 518 and 522 whether the frequency is either the nearest high altitude frequency or the nearest low altitude frequency for the current aircraft position. If either of these cases apply, the frequency is selected for display in step 440, and the next database entry is retrieved in step 400. If neither case applies, the database entry is ignored and the next database entry is retrieved in step 400. If the frequency was not associated with a Flight Watch service of the FSS, it is then ascertained in a step 510 whether the FSS is one of the two FSS nearest to the aircraft. If so, it is then ascertained in a step 514 whether the frequency is one of the five frequencies nearest to the current position of the aircraft. If so, the frequency is selected for display in step 440, possibly replacing another FSS or frequency. If neither case applies, the database entry is discarded. In any case, another database entry is retrieved in step 400.

If it was determined in step 498 that the database entry did not correspond to an FSS, it is then ascertained in a step 526 whether the database entry corresponds to a voice broadcast service. If not, then the database entry does not correspond to any information that will be displayed in this embodiment, so the database entry is discarded and the next database entry is retrieved in step 400. However, if the database entry does correspond to a voice broadcast service, it is then ascertained in a step 528 whether the voice broadcast service is located nearest to the aircraft. If so, then the frequency is selected for display in step 440. However, if the voice broadcast service is not located nearest to the aircraft, it is then ascertained in steps 530 and 534 whether the voice broadcast service is within 50 nm of six further set points along the flight route and is not a duplicate of another voice broadcast database entry previously selected for display. Such points typically are evenly spaced approximately every thirty miles along the route, but some other spacing may be employed. If so, it is then further ascertained whether the transmitter for the voice broadcast service is nearest to the six further set points along the route. If neither of these criteria is met, the database entry is discarded and a new database entry is retrieved in step 400.

If the frequency is nearest to the six further set points, it is then ascertained in a step 538 whether the voice broadcast service is either an ASOS or an AWOS service. If so, it is then ascertained in a step 542 whether a currently selected frequency in the display list for that facility corresponds to an ATIS voice broadcast service. If so, the ATIS frequency is replaced with the current ASOS or AWOS frequency in a step 546, and processing continues in step 440. If it is determined in step 538 that the frequency does not correspond to an ASOS or AWOS voice broadcast service, it is then ascertained in a step 550 whether there is already an ASOS or AWOS frequency in the display list for that facility. If so, then the database entry is discarded and a new database entry is retrieved in step 400. Otherwise, the database entry is selected for display in step 440 and the next database entry is retrieved in step 400. The purpose of steps 538, 542, 546 and 550 is to ensure that the ASOS and AWOS frequencies are given priority if an airport has both services.

Once the facilities and frequencies are selected for display, the airport or center facility most likely to be of interest to the pilot is highlighted or otherwise flagged in first level nominate menu 102, and the frequency associated with each facility that is most likely to be needed by the pilot is highlighted or otherwise flagged in second level nominate menus 106A–106F. Which header in first level nominate menu 102 is nominated typically is determined by proximity to the aircraft. However, which frequencies in second level nominate menus 106A–106F are nominated is determined by the algorithm shown in FIGS. 11A–11B. The algorithm typically is performed by header/frequency nominate component 298 in processor 240.

After power up, it is ascertained in a step 600 whether the aircraft ground speed is unknown or less than 30 kt. If so, the aircraft is determined to be in the taxi-out state in a step 604, and the process generally sequences through the frequencies beginning with the first frequency associated with the header for the departure airport. As part of that process, it is ascertained in a step 608 whether the frequency already appears as the active frequency 86 or standby frequency 90 or was recently accepted from a second level nominate menu 106A–106C per the state diagram shown in FIG. 8. If so, processing advances to the next frequency in a step 612 and returns to step 608. These steps are provided because clearly there is no need to nominate a frequency that already is available as the active or standby frequency. Also, a frequency once used is unlikely to be needed again in the taxi-out state. In this embodiment, a frequency has been recently accepted from second level nominate menus 106A–106F if it was one of the last four frequencies transferred from a second level nominate menu 106A–106F. If the frequency does not appear as the active frequency 86 or standby frequency 90 and was not recently accepted from the second level nominate menu 106A–106C, it is then ascertained in a step 616 whether the frequency is a PCL or CTAF frequency. Since these frequencies usually are not needed when taxiing outbound, they are not candidates for nomination in this state. Accordingly, if these frequencies are encountered then processing advances to the next frequency in step 612 and returns to step 608. If these frequencies are not encountered, then the currently considered frequency is nominated in a step 620 and highlighted or otherwise flagged on second level nominate menu 106A.

If it is determined in step 600 that the aircraft groundspeed is greater than 30 kt, then the aircraft is determined to be in the airborne state in a step 624. It is then ascertained in a step 628 whether the aircraft is greater than 4 nm from the departure airport or has an altitude greater than 2500 ft. If not, the aircraft is determined to be in the departure state in a step 632. It is then ascertained in a step 636 whether there are any enroute frequencies associated with the departure airport. If so, the process generally sequences through the enroute frequencies for the departure airport in a step 640. In this embodiment, enroute frequencies include CL B, CL C, TRSA, CTA, TMA, DEP, RDR, CTR, APR, ARVL and DIR frequencies as set forth in the Jeppesen database. The ATIS, ASOS and/or AWOS frequencies may be processed or skipped as desired. As part of the sequencing through the enroute frequencies of the originating airport, it is ascertained in a step 644 whether the frequency already appears as the active frequency 86 or standby frequency 90 or was recently accepted from the second level nominate menu 106A–106C. If so, processing advances to the next frequency in a step 648 and returns to step 644. If not, it is then ascertained whether the frequency typically is considered an arrival frequency in a step 652. Of the frequencies given in the above list, APR, ARVL and DIR are generally considered arrival frequencies. Since arrival frequencies at the departure airport are rarely used at this stage of the flight, they are skipped in this embodiment. If the frequency is not an arrival frequency, then the frequency is nominated in a step 656 and highlighted or otherwise flagged on second level nominate menu 106A. It should be understood that the rules used for nominating a frequency can vary for the particular application. For example, if the originating airport has a DEP frequency, then that frequency often is the most desirable frequency, and it may be nominated and displayed as shown in FIG. 1. After the nomination, processing reverts to step 628.

If it is determined that the aircraft is greater than 4 nm miles from the departure airport or above 2500 feet, or if there are no enroute frequencies associated with the departure airport, or if the arrival frequency group for the originating airport is reached, the aircraft is determined to be in the enroute state in a step 660 and the process skips to the next header in first level nominate menu 102. It is then ascertained in a step 664 (FIG. 11B) whether the header corresponds to the arrival airport. If not, then the process generally sequences through the enroute headers and the frequencies of the various enroute headers in a step 668. In this process, each header and frequency is evaluated based on the current position of the aircraft (the facility and frequency closest to the aircraft is preferred), direction of the aircraft (frequencies specifically associated with a range of headings containing the current aircraft heading are preferred), altitude (some frequencies are associated with altitude ranges), and speed. Aircraft speed usually is used to predict an encounter with an airspace in the manner set forth in FIG. 12.

As part of the sequencing through the enroute frequencies of the various headers, it is ascertained in a step 672 whether the frequency already appears as the active frequency 86 or standby frequency 90 or was recently accepted from a second level nominate menu 106A–106C. If so, processing advances to the next frequency in a step 676 and returns to step 672. If not, then the frequency is nominated in a step 686 and highlighted or otherwise flagged on second level nominate menu 106A. After the nomination, processing reverts to step 664.

If it is determined in step 664 that the aircraft has reached the arrival airport (usually by nominating the arrival airport header in first level nominate menu 102, or whenever a header is nominated that corresponds to an airport that is part of the route and is located in Class D, E or G airspace), then the aircraft is determined to be in an arrival state in a step 684. It is then ascertained in a step 688 whether the aircraft ground speed again is unknown or less than 30 kt. If not (which is usually the case after immediately being in the enroute state), then the process generally sequences through the arrival frequencies in a step 692. These frequencies may include the ATIS, ASOS and/or AWOS frequencies at the arrival airport, if desired, so that the pilot may learn weather conditions and pertinent information at the destination airport. Not surprisingly, nomination usually begins with the APR frequency at a Class B or C airport. Nomination preferably begins with the TWR frequency at a Class D airport and the CTAF frequency at Class E and G airports.

As part of the sequencing through the arrival frequencies of the various headers, it is ascertained in a step 696 whether the frequency already appears as the active frequency 86 or standby frequency 90 or was recently accepted from a second level nominate menu 106A–106C. If so, processing advances to the next frequency in a step 700 and returns to step 696. If not, then the frequency is nominated in a step 704 and highlighted or otherwise flagged on second level nominate menu 106A. After the nomination, processing reverts to step 688.

If it is determined in step 688 that the aircraft ground speed is unknown or less than 30 kt after the aircraft has already been in a taxi-out state and progressed to a different state since power up, the aircraft is determined to be in a taxi-in'state in a step 708, and the ground frequencies typically are nominated in reverse order in the list (i.e., reverse to the order of nomination when the aircraft was in the taxi-out state) in a step 712.

Figure 12:
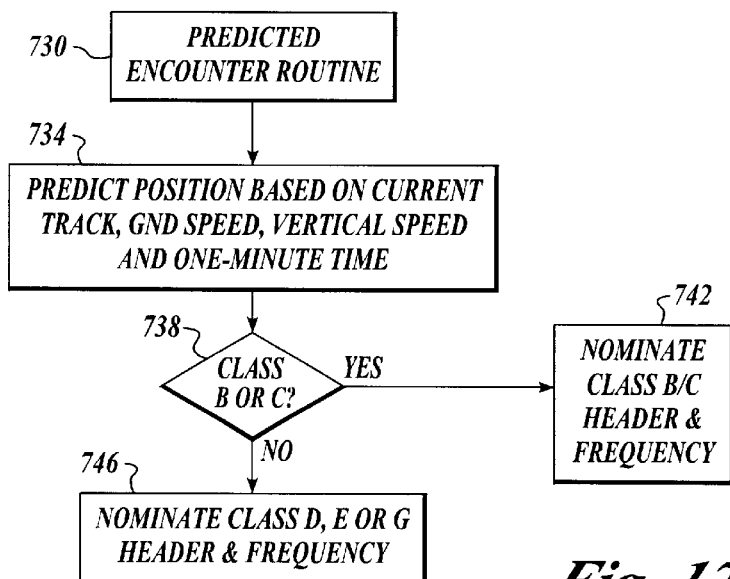
FIG. 12 illustrates a flowchart of a particular embodiment of an algorithm for nominating a frequency based on a predicted entry into or passage by an airspace.

As noted above, header and frequency nomination also takes into account predicted encounters with airspaces and facilities along the route. FIG. 12 illustrates a particular embodiment of an algorithm used for such predictions. A predicted encounter routine is begun in a step 730. As part of that routine, prediction process component 322 predicts a future position of the aircraft in a step 734 based on the current track of the aircraft, the current ground speed, the current vertical speed, and a one-minute time interval. It is then ascertained in a step 738 whether the aircraft is predicted to encounter or be in closest proximity to a Class B or C airspace, since these airspaces have the strictest requirements for entry and passage. In general, the lateral and vertical extent of any airspace would be determined by any currently published data, either in database 282 or elsewhere. In this embodiment, the vertical extent for a Class B airspace is the published altitude for the top of the airspace plus the vertical extent of any SUA buffer, whereas the vertical extent for a Class C airspaces is 4,000 feet above the airport plus the vertical extent of any SUA buffer. The lateral extent for both Class B and C airspaces is assumed to be 50 nm. If it is determined in step 738 that the aircraft will encounter or be in closest proximity to such airspaces in one minute, then the corresponding Class B or C airspace header is nominated, and the appropriate radar or approach frequency for the current altitude and radial is nominated in a step 742.

If the aircraft is not predicted to encounter or be in closest proximity to a Class B or C airspace, then the aircraft will encounter or be in closest proximity to a Class D, E or G airspace. The vertical extent for class D, E and G airspaces is 2500 feet above the airport plus the vertical extent of any SUA buffer above the airport, and the lateral extent is the lesser of 10 nm or the distance traveled by the aircraft in seven minutes at the current airspeed. The header and frequencies corresponding to the facility nearest to the current position are nominated in a step 746. The TWR frequency usually is nominated for a Class D airspace, and the CTAF frequency usually is nominated for a Class E or G airspace.

Figure 13:
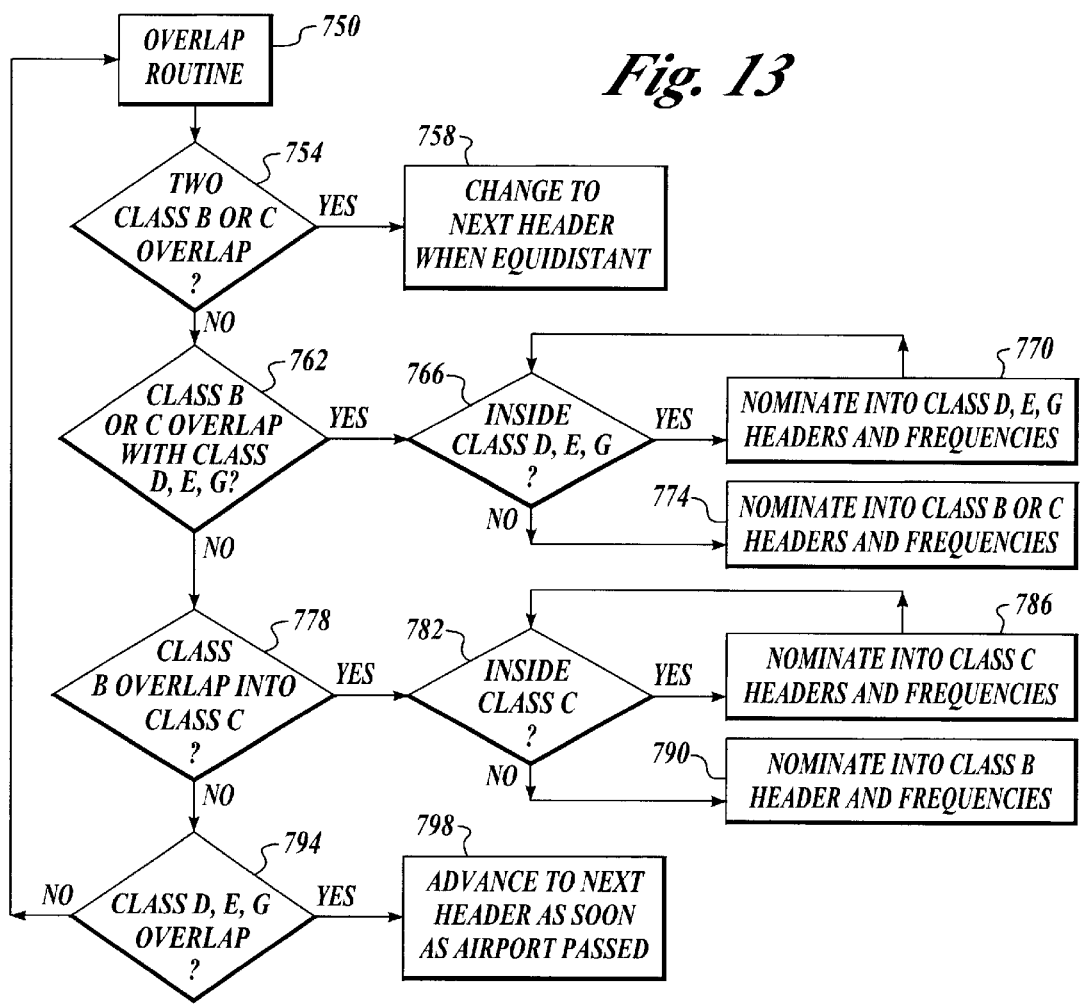
FIG. 13 illustrates a flowchart of a particular embodiment of an algorithm for nominating a frequency when airspaces overlap.

Sometimes airspaces may overlap. The algorithm illustrated in FIG. 13 is used to determine the appropriate header and frequencies to nominate in these situations. The vertical and lateral dimensions noted above for each airspace is used in this algorithm as well. Overlap process component 326 enters the overlap routine in a step 750. It is then ascertained in a step 754 whether two Class B airspaces overlap with each other or two Class C airspaces overlap with each other. If so, then the headers and frequencies for the airspace closest to the aircraft are nominated initially, and then the headers and frequencies associated with the other airspace are nominated when the aircraft position is equidistant between the two airspaces as shown in step 758. If two Class B or C airspaces do not overlap, it is then ascertained in a step 762 whether a Class B or C airspace overlaps with a Class D, E or G airspace. If so, it is then ascertained in a step 766 whether the aircraft position is within a Class D, E or G airspace. If so, the headers and frequencies in the Class D, E or G airspace are nominated in a step 770, and processing reverts to step 766. When the aircraft no longer is in the Class D, E or G airspace, then headers and frequencies in the Class B or C airspace are nominated in step 774. In other words, headers and frequencies for the Class B or C airspace are used except when the aircraft is specifically located within the Class D, E or G airspace.

If it is determined in step 762 that a Class B or Class C airspace does not overlap with a Class D, E or G airspace, it is then ascertained in a step 778 whether a Class B airspace overlaps with a Class C airspace. If so, it is then ascertained in a step 782 whether the aircraft is located within the Class C airspace. If so, the headers and frequencies in the Class C airspace are nominated in a step 786, and processing reverts to step 782. When the aircraft no longer is located in the Class C airspace, then headers and frequencies in the Class B airspace are nominated in step 790. In other words, headers and frequencies for the Class B airspace are used except when the aircraft is specifically located within the Class C airspace.

If it is determined in step 778 that a Class B airspace does not overlap with a Class C airspace, it is then ascertained in a step 794 whether a Class D, E or G airspace overlaps with another Class D, E or G airspace. If so, then the header associated with the airspace for the aircraft position is nominated until the aircraft passes the facility (airport) associated with the airspace. Thereafter, the headers and frequencies associated with the other airspace is nominated as shown in step 798. If there are no overlaps, then processing reverts to step 750.

Figure 14:
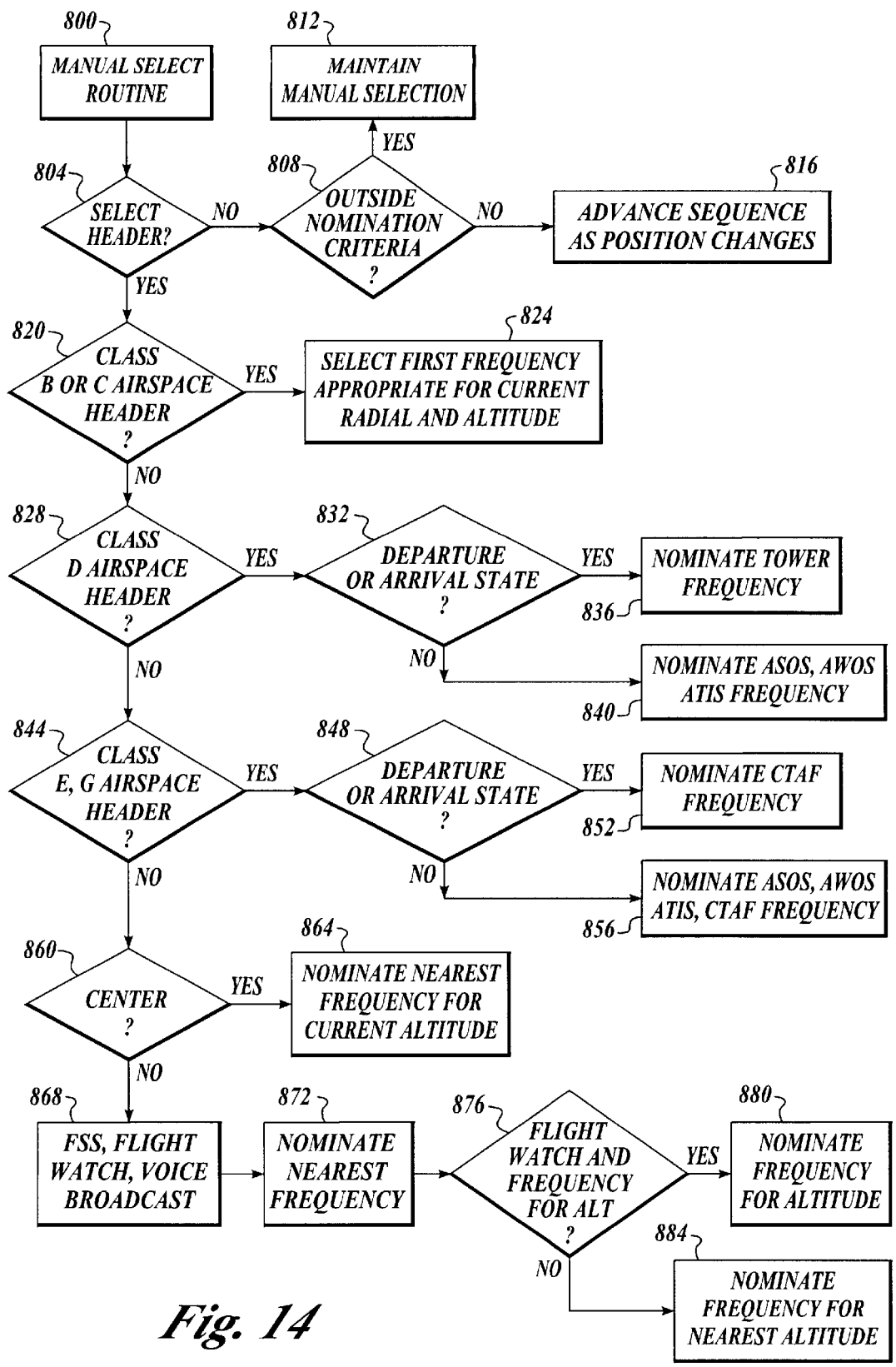
FIG. 14 illustrates a flowchart of a particular embodiment of an algorithm for nominating a frequency when a pilot manually selects a header and/or frequency.

If during the flight the pilot manually moves the cursor to a header or frequency other than a nominated header or frequency, then FIG. 14 illustrates the subsequent processing by manual select process component 330. The manual select routine is entered in a step 800. It is first ascertained in a step 804 whether the pilot manually selected a header or a frequency. If a frequency was manually selected, it is then ascertained in a step 808 whether the selected frequency is outside the nomination criteria. In other words, it is a frequency that ordinarily would not be nominated (such as a CTAF frequency at a Class D airport). In that case the manual selection is maintained in a step 812 until a new header is nominated or manually selected by the pilot. However, if the manually selected frequency is one that would be nominated under the appropriate conditions, then nomination will continue and the sequence of frequencies advanced accordingly in step 816.

If it is determined in step 804 that a header rather than a frequency was manually selected by the pilot, it is then ascertained in a step 820 if the header corresponds to a Class B or C airspace. If so, then the first frequency appropriate for the current radial and altitude is nominated in a step 824. If the selected header does not correspond to a Class B or C airspace, it is then ascertained in a step 828 whether the selected header corresponds to a Class D airspace. In general, the ASOS, AWOS and ATIS frequencies of a class D airspace are nominated when the aircraft is outside the criteria that would nominate into the selected header, and the TWR frequency is nominated if the aircraft is inside the criteria that would nominate into this header. In this embodiment, it is ascertained in a step 832 whether the aircraft is in either a departure or an arrival state. If the aircraft is in one of these states, then the TWR frequency is nominated in a step 836. If the aircraft is not in a departure or an arrival state, then one of the ASOS, AWOS or ATIS frequencies are nominated (in that order if more than one to choose from) in a step 840.

If the selected header does not correspond to a Class D airspace, it is then ascertained in a step 844 whether the selected header corresponds to a Class E or G airspace. In general, the ASOS, AWOS and ATIS frequencies (or CTAF if those are not available) of a class E or G airspace are nominated when the aircraft is outside the criteria that would nominate into the selected header, and the CTAF frequency is nominated if the aircraft is inside the criteria that would nominate into this header. In this embodiment, it is ascertained in a step 848 whether the aircraft is in either a departure or an arrival state. If the aircraft is in one of these states, then the CTAF frequency is nominated in a step 852. If the aircraft is not in a departure or an arrival state, then one of the ASOS, AWOS or ATIS frequencies are nominated (in that order if more than one to choose from) in a step 856. The CTAF frequency is nominated if those frequencies are not available.

If it is determined in step 844 that the manually selected header does not correspond to a Class E or G airspace, it is then ascertained in a step 860 whether the selected header corresponds to a Center. If so, then the nearest frequency for the current altitude is nominated in a step 864. If it is determined that the selected header does not correspond to a Center, then the selected header must be either an FSS, Flight Watch or Voice Broadcast header as indicated in step 868. In that case the frequency nearest to the aircraft is nominated in a step 872. Furthermore, if it is ascertained in a step 876 that a Flight Watch header was selected and there is a frequency associated with the current altitude, then that frequency is nominated in a step 880. Otherwise, the frequency for the other altitude is nominated in a step 884.

While the above is a description of various embodiments of the present invention, further modifications may be employed without departing from the spirit and scope of the present invention. For example, as used herein, a facility may be either an organization (e.g., a Center), a subsidiary of an organization (e.g., a remote communication facility of a Center), a service offered by an organization (e.g., departure control at an airport), a transmission by an organization (e.g., ATIS or a communication frequency associated with a radial in a Class B airspace), and so on. The mileages used to determine proximity to the aircraft or to the flight route can be varied to suit the application. While the specific embodiment described above was directed to nomination for communication facilities, the present invention also could be applied to navigation frequencies used in the VLOC frequency display 74 or to some other frequency requirement. The first level nominate menu can contain only general headers similar to the headers for FLIGHT SERVICE, FLIGHT WATCH, VOICE BROADCAST, it can contain only headers indicating specific facility data such as the airport and Center headers, or it can combine the two formats as indicated in FIG. 1. Additional or different facility types and frequencies can be indicated in the first level nominate menu and/or second level nominate menus. Facilities, frequencies and any associated information can be grouped as desired. More or less information for each facility or frequency can be provided as desired. The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An aviation facility nominating device for an aircraft comprising;

a position receiving component that receives position data indicating a position of the aircraft;

a status receiving component that receives an aircraft status indicating a phase of flight;

an aviation data receiving component that receives aviation data and location data associated with a plurality of aviation facilities;

a facility selecting component for selecting aviation data for a selected plurality of the aviation facilities based on a distance from the aircraft to each of said selected aviation facilities; and a nominating component that nominates at least one but not all of the selected plurality of aviation facilities as a nominated aviation facility likely to be of interest to a pilot based on the aircraft status and the distance from the aircraft to each of said selected aviation facilities.

2. The device according to claim 1 further comprising a speed receiving component that receives speed data indicating a current speed of the aircraft, and wherein the nominating component nominates the at least one of the selected plurality of aviation facilities based on the current speed of the aircraft.

3. The device according to claim 1 wherein the status receiving component further comprises a taxi status component that determines whether the aircraft is in one of a taxi-in state and a taxi-out state, and wherein the nominating component nominates the at least one of the selected plurality of aviation facilities based on whether the aircraft is in the taxi-in state or in the taxi-out state.

4. The device according to claim 1 wherein the status receiving component further comprises a taxi/airborne status component that determines whether the aircraft is in one of a taxi state and an airborne state, and wherein the nominating component nominates the at least one of the selected plurality aviation facilities based on whether the aircraft is in the taxi state or in the airborne state.

5. The device according to claim 1 wherein the status receiving component further comprises a departure/enroute status component that determines whether the aircraft is in one of a departure state and an enroute state, and wherein the nominating component nominates the at least one of the selected plurality of aviation facilities based on whether the aircraft is in the departure state or in the enroute state.

6. The device according to claim 1 wherein the status receiving component further comprises an enroute/arrival status component that determines whether the aircraft is in one of an enroute state and an arrival state, and wherein the nominating component nominates the at least one of the selected plurality of aviation facilities based on whether the aircraft is in the enroute state or in the arrival state.

7. The device according to claim 1 further comprising an altitude receiving component that receives altitude data indicating a current altitude of the aircraft, and wherein the nominating component nominates the at least one of the selected plurality of aviation facilities based on the current altitude of the aircraft.

8. The device according to claim 1 further comprising a radial receiving component that receives radial data indicating a current radial position of the aircraft relative to the selected plurality of aviation facilities, and wherein the nominating component nominates the at least one of the selected plurality of aviation facilities based on the current radial position of the aircraft relative to the selected plurality of aviation facilities.

9. The device according to claim 1 wherein at least one of the selected plurality of aviation facilities has a signal with a prescribed frequency associated with it.

10. The device according to claim 9 wherein each of the plurality of selected aviation facilities has a signal with a prescribed frequency associated with it.

11. An aviation facility nominating device for an aircraft comprising;
  a position receiving component that receives position data indicating a position of the aircraft;
  an aviation data receiving component that receives aviation data and location data associated with a plurality of aviation facilities, wherein each aviation facility has a plurality of signals associated with it, each of the plurality of signals having a prescribed frequency;
  a facility selecting component for selecting aviation data for a selected plurality of the aviation facilities based on a distance from the aircraft to each of said selected aviation facilities; and
  a nominating component that nominates at least one but not all of the selected plurality of aviation facilities as a nominated aviation facility likely to be of interest to a pilot based on the distance from the aircraft to each of said selected aviation facilities, and that further nominates at least one but not all of the plurality of signals of each nominated aviation facility as a nominated signal likely to be of interest to the pilot.

12. The device according to claim 11 further comprising a taxi status component that determines whether the aircraft is in one of a taxi-in state and a taxi-out state, and wherein the nominating component nominates the at least one of the plurality of signals based on whether the aircraft is in the taxi-in state or in the taxi-out state.

13. The device according to claim 11 further comprising a taxi/airborne status component that determines whether the aircraft is in one of a taxi state and an airborne state, and wherein the nominating component nominates the at least one of the plurality signals based on whether the aircraft is in the taxi state or in the airborne state.

14. The device according to claim 11 further comprising a departure/enroute status component that determines whether the aircraft is in one of a departure state and an enroute state, and wherein the nominating component nominates the at least one of the plurality of signals based on whether the aircraft is in the departure state or in the enroute state.

15. The device according to claim 11 further comprising an enroute/arrival status component that determines whether the aircraft is in one of an enroute state and an arrival state, and wherein the nominating component nominates the at least one of the plurality of signals based on whether the aircraft is in the enroute state or in the arrival state.

16. The device according to claim 11 further comprising an altitude receiving component that receives altitude data indicating a current altitude of the aircraft, and wherein the nominating component nominates the at least one of the plurality of signals based on the current altitude of the aircraft.

17. The device according to claim 11 further comprising a radial receiving component that receives radial data indicating a current radial position of the aircraft relative to the selected plurality of aviation facilities, and wherein the nominating component nominates the at least one of the plurality of signals based on the current radial position of the aircraft relative to the selected plurality of aviation facilities.

18. An aviation signal nominating device comprising;
  a position receiving component that receives position data indicating a position of an aircraft;
  a status receiving component that receives an aircraft status indicating a phase of flight;
  an aviation signal receiving component that receives a plurality of aviation signals associated with an aviation facility, each aviation signal having a prescribed frequency; and
  a nominating component that nominates at least one but not all of the plurality of aviation signals as a nominated aviation signal likely to be of interest to a pilot based on the aircraft status and the position of the aircraft.

19. The device according to claim 18 wherein the status receiving component further comprises a taxi status component that determines whether the aircraft is in one of a taxi-in state and a taxi-out state, and wherein the nominating component nominates the at least one of the plurality of aviation signals based on whether the aircraft is in the taxi-in state or in the taxi-out state.

20. The device according to claim 19 wherein the nominating component nominates only one of the plurality of aviation signals associated with the aviation facility.

21. The device according to claim 18 wherein the status receiving component further comprises a taxi/airborne status component that determines whether the aircraft is in one of a taxi state and an airborne state, and wherein the nominating component nominates the at least one of the plurality aviation signals based on whether the aircraft is in the taxi state or in the airborne state.

22. The device according to claim 21 wherein the nominating component nominates only one of the plurality of aviation signals associated with the aviation facility.

23. The device according to claim 18 wherein the status receiving component further comprises a departure/enroute status component that determines whether the aircraft is in one of a departure state and an enroute state, and wherein the nominating component nominates the at least one of the plurality of aviation signals based on whether the aircraft is in the departure state or in the enroute state.

24. The device according to claim 23 wherein the nominating component nominates only one of the plurality of aviation signals associated with the aviation facility.

25. The device according to claim 18 wherein the status receiving component further comprises an enroute/arrival status component that determines whether the aircraft is in one of an enroute state and an arrival state, and wherein the nominating component nominates the at least one of the plurality of aviation signals based on whether the aircraft is in the enroute state or in the arrival state.

26. The device according to claim 25 wherein the nominating component nominates only one of the plurality of aviation signals associated with the aviation facility.

27. The device according to claim 18 further comprising an altitude receiving component that receives altitude data indicating a current altitude of the aircraft, and wherein the nominating component nominates the at least one of the plurality of aviation signals based on the current altitude of the aircraft.

28. The device according to claim 27 wherein the nominating component nominates only one of the plurality of aviation signals associated with the aviation facility.

29. An aviation signal nominating device comprising;
   a position receiving component that receives position data indicating a position of an aircraft;
   an aviation signal receiving component that receives a plurality of aviation signals associated with an aviation facility, each aviation signal having a prescribed frequency;
   a radial receiving component that receives radial data indicating a current radial position of the aircraft relative to the aviation facility; and
   a nominating component that nominates at least one but not all of the plurality of aviation signals as a nominated aviation signal likely to be of interest to a pilot based on the position of the aircraft and the current radial position of the aircraft relative to the aviation signal, wherein the nominating component nominates only one of the plurality of aviation signals associated with the aviation facility.

30. An aviation signal nominating device comprising;
   a position receiving component that receives position data indicating a position of an aircraft;
   an aviation signal receiving component that receives a plurality of aviation signals associated with an aviation facility, each aviation signal having a prescribed frequency;
   a frequency communicating component for communicating a frequency value to another component; and
   a nominating component that nominates at least one but not all of the plurality of aviation signals as a nominated aviation signal likely to be of interest to a pilot based on the position of the aircraft, wherein the nominating component nominates the at least one of the plurality of aviation signals as a nominated aviation signal when the frequency of the aviation signal does not match the frequency value communicated to the other component.

31. An aviation signal nominating device comprising;
   a position receiving component that receives position data indicating a position of an aircraft;
   an aviation signal receiving component that receives a plurality of aviation signals associated with an aviation facility, each aviation signal having a prescribed frequency;
   a frequency display component for displaying a frequency value; and
   a nominating component that nominates at least one but not all of the plurality of aviation signals as a nominated aviation signal likely to be of interest to a pilot based on the position of the aircraft, wherein the nominating component nominates the at least one of the plurality of aviation signals as a nominated aviation signal only when the frequency of the aviation signal does not match the frequency value displayed by the frequency display.

32. The device according to claim 31 wherein the frequency display displays at least one of an active frequency value and a standby frequency value, and wherein the nominating component nominates the at least one of the plurality of aviation signals as a nominated aviation signal only when the frequency value of the aviation signal does not match the at least one of the active frequency value and the standby frequency value.

33. An aviation signal frequency value nominating device comprising;
   a position receiving component that receives position data indicating a position of an aircraft;
   an aviation data receiving component that receives aviation data associated with a plurality of aviation facilities;
   wherein the aviation data for each of the plurality of aviation facilities includes an aviation signal having a prescribed frequency value;
   a nominating component that nominates one of the plurality of aviation facilities as a nominated aviation facility based on a position of the aircraft; and
   a display for displaying information corresponding to at least selected ones of the plurality of aviation facilities together with the frequency value of their associated aviation signal in addition to the frequency value of the nominated aviation facility.

34. The device according to claim 33 wherein the display displays information corresponding to at least selected ones of the plurality of the aviation facilities in addition to the nominated aviation facility.

35. The device according to claim 34 wherein the information displayed for each aviation facility is displayed in the order of at least one of proximity to the aircraft and proximity to a flight route.

36. The device according to claim 35 wherein the display includes a first level display that displays a header indicating a facility type and a second level display that displays information corresponding to the nominated aviation facility and the frequency value of its associated aviation signal together with the information corresponding to the selected ones of the plurality of aviation facilities and the frequency values of their associated aviation signals.

37. The device according to claim 36 wherein the information displayed in the second level display for each aviation facility is displayed in the order of at least one of proximity to the aircraft and proximity to a flight route.

38. An aviation signal frequency value nominating device comprising;
   a position receiving component that receives position data indicating a position of an aircraft;
   an aviation data receiving component that receives aviation data associated with a plurality of aviation facilities, wherein the aviation data for each of the plurality of aviation facilities includes a plurality of aviation signals, each of the plurality of aviation signals having a prescribed frequency value;
   a nominating component that nominates one of the plurality of aviation facilities as a nominated aviation facility based on a position of the aircraft wherein the nominating component nominates one of the plurality of aviation signals associated with the nominated aviation facility as a nominated aviation signal likely to be of interest to a pilot; and
   a display for displaying the frequency value of the nominated aviation signal.

39. The device according to claim 38 further comprising a speed receiving component that receives speed data indicating a current speed of the aircraft, and wherein the nominating component nominates the nominated aviation facility based on the current speed of the aircraft.

40. The device according to claim 38 further comprising a taxi status component that determines whether the aircraft is in one of a taxi-in state and a taxi-out state, and wherein the nominating component nominates the nominated aviation signal based on whether the aircraft is in the taxi-in state or in the taxi-out state.

41. The device according to claim 38 further comprising a taxi/airborne status component that determines whether the aircraft is in one of a taxi state and an airborne state, and wherein the nominating component nominates the nominated aviation signal based on whether the aircraft is in the taxi state or in the airborne state.

42. The device according to claim 38 further comprising a departure/enroute status component that determines whether the aircraft is in one of a departure state and an enroute state, and wherein the nominating component nominates the nominated aviation signal based on whether the aircraft is in the departure state or in the enroute state.

43. The device according to claim 38 further comprising an enroute/arrival status component that determines whether the aircraft is in one of an enroute state and an arrival state, and wherein the nominating component nominates the nominated aviation signal based on whether the aircraft is in the enroute state or in the arrival state.

44. The device according to claim 38 further comprising an altitude receiving component that receives altitude data indicating a current altitude of the aircraft, and wherein the nominating component nominates the nominated aviation signal based on the current altitude of the aircraft.

45. The device according to claim 38 further comprising a radial receiving component that receives radial data indicating a current radial position of the aircraft relative to the nominated aviation facility, and wherein the nominating component nominates the nominated aviation signal based on the current radial position of the aircraft relative to the nominated aviation facility.

46. The device according to claim 38 further comprising:
a frequency communicating component for communicating the frequency value associated with the nominated aviation signal value to another component; and
wherein the nominating component nominates a particular aviation signal only when the frequency value of the aviation signal does not match the frequency value communicated to the other component.

47. The device according to claim 38 wherein the display displays at least one of an active frequency value and a standby frequency value, and wherein the nominating component nominates a particular aviation signal only when the frequency value of the aviation signal does not match the at least one of the active frequency value and the standby frequency value.

48. The device according to claim 38 wherein the display displays frequency values of at least selected ones of the plurality of aviation signals associated with the nominated aviation facility in addition to the frequency value of the nominated aviation signal.

49. The device according to claim 48 wherein the display displays a cursor at the frequency value of the nominated aviation signal.

50. The device according to claim 38 wherein the frequency values are displayed in the order of at least one of proximity to the aircraft and proximity to a flight route.

51. The device according to claim 38 wherein the display displays information corresponding to the nominated aviation facility.

52. The device according to claim 51 wherein the display includes a first level display displaying a header associated with the nominated aviation facility and a second level display displaying the frequency value of the nominated aviation signal.

53. The device according to claim 52 wherein the header indicates a name of the nominated aviation facility.

54. The device according to claim 52 wherein the header indicates a facility type of the nominated aviation facility.

55. The device according to claim 52 wherein the second level display displays frequency values of at least selected ones of the plurality of aviation signals associated with the nominated aviation facility in addition to the frequency value of the nominated aviation signal.

56. The device according to claim 55 wherein the second level display displays a cursor at the frequency value of the nominated aviation signal.

57. The device according to claim 55 wherein the frequency values are displayed in the order of at least one of proximity to the aircraft and proximity to a flight route.

58. The device according to claim 52 wherein the second level display displays information corresponding to the nominated aviation facility.

59. The device according to claim 58 wherein the first level display displays a header indicating a facility type of the nominated aviation facility.

60. The device according to claim 58 wherein the second level display displays frequency values of at least selected ones of the plurality of aviation signals associated with the nominated aviation facility in addition to the frequency value of the nominated aviation signal.

61. The device according to claim 60 wherein the second level display displays a cursor at the frequency value of the nominated aviation signal.

62. The device according to claim 60 wherein the frequency values are displayed in the order of al least one of proximity to the aircraft and proximity to a flight route.

63. The device according to claim 52 wherein the header displays information corresponding to the nominated aviation facility.

64. The device according to claim 63 wherein the header indicates a name of the nominated aviation facility.

65. The device according to claim 63 wherein the first level display displays information corresponding to at least selected ones of the plurality of the aviation facilities in addition to the nominated aviation facility.

66. The device according to claim 65 wherein the information displayed for each aviation facility is displayed in the order of at least one of proximity to the aircraft and proximity to a flight route.

67. The device according to claim 65 wherein the second level display displays frequency values of at least selected ones of the plurality of aviation signals associated with the nominated aviation facility in addition to the frequency value of the nominated aviation signal.

68. The device according to claim 67 wherein the first level display displays a first cursor at the information corresponding to the nominated aviation facility, and wherein the second level display displays a second cursor at the frequency value corresponding to the nominated aviation signal.

69. The device according to claim 67 wherein the information displayed in the first level display for each aviation facility is displayed in the order of at least one of proximity to the aircraft and proximity to a flight route, and wherein the frequency values displayed in the second level display are displayed in the order of the at least one of proximity to the aircraft and proximity to the flight route.

* * * * *